United States Patent
Seo et al.

(10) Patent No.: US 9,999,015 B2
(45) Date of Patent: Jun. 12, 2018

(54) METHOD FOR SYNCHRONIZATION BETWEEN USER EQUIPMENT FOR DEVICE-TO-DEVICE (D2D) COMMUNICATION IN WIRELESS COMMUNICATION SYSTEM AND APPARATUS FOR SAME

(71) Applicant: LG ELECTRONICS INC., Seoul (KR)

(72) Inventors: Daewon Seo, Seoul (KR); Hanbyul Seo, Seoul (KR); Byounghoon Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 68 days.

(21) Appl. No.: 15/023,468

(22) PCT Filed: Sep. 17, 2014

(86) PCT No.: PCT/KR2014/008650
§ 371 (c)(1),
(2) Date: Mar. 21, 2016

(87) PCT Pub. No.: WO2015/046802
PCT Pub. Date: Apr. 2, 2015

(65) Prior Publication Data
US 2016/0212724 A1 Jul. 21, 2016

Related U.S. Application Data

(60) Provisional application No. 61/883,204, filed on Sep. 27, 2013, provisional application No. 61/895,412, filed on Oct. 25, 2013.

(51) Int. Cl.
*H04W 56/00* (2009.01)
*H04W 48/16* (2009.01)
(Continued)

(52) U.S. Cl.
CPC .......... *H04W 56/0025* (2013.01); *H04L 1/00* (2013.01); *H04W 4/008* (2013.01); *H04W 48/16* (2013.01); *H04W 56/002* (2013.01)

(58) Field of Classification Search
CPC . H04W 4/008; H04W 56/0025; H04W 72/04; H04W 76/023; H04L 5/14;
(Continued)

(56) References Cited

U.S. PATENT DOCUMENTS

2009/0276540 A1* 11/2009 Ahn ............... H04L 67/104
709/243
2012/0320776 A1* 12/2012 Lim ............... H04W 56/002
370/252
(Continued)

FOREIGN PATENT DOCUMENTS

KR 10-2012-0140000 A 12/2012
KR 10-2013-0082062 A 7/2013
(Continued)

*Primary Examiner* — Jae Y Lee
*Assistant Examiner* — Jean F Voltaire
(74) *Attorney, Agent, or Firm* — Birch, Stewart, Kolasch & Birch, LLP

(57) ABSTRACT

The present invention relates to a method for detecting a synchronization signal for device-to-device (D2D) in a wireless communication system. More specifically, the method comprises a step of detecting at least one synchronization signal, which is transmitted repeatedly for D2D communication, in a synchronization signal transmission period for D2D communication, wherein the at least one synchronization signal comprises at least one synchronization sequence generated on the basis of a first root index according to a synchronization reference ID.

14 Claims, 14 Drawing Sheets

(51) Int. Cl.
*H04L 1/00* (2006.01)
*H04W 4/00* (2018.01)

(58) Field of Classification Search
CPC ... H04L 1/0031; H04L 1/1854; H04L 5/0007; H04L 5/0055
USPC .......................................................... 370/511
See application file for complete search history.

(56) References Cited

U.S. PATENT DOCUMENTS

| | | | |
|---|---|---|---|
| 2014/0254429 A1* | 9/2014 | Wang | ................ H04L 5/0037 370/254 |
| 2014/0321452 A1 | 10/2014 | Choi et al. | |
| 2015/0055616 A1 | 2/2015 | Kim et al. | |
| 2015/0304149 A1 | 10/2015 | Kim et al. | |

FOREIGN PATENT DOCUMENTS

| WO | WO 2013/081393 A1 | 6/2013 |
|---|---|---|
| WO | WO 2013/125887 A1 | 8/2013 |
| WO | WO 2013/125925 A1 | 8/2013 |

\* cited by examiner

FIG. 2
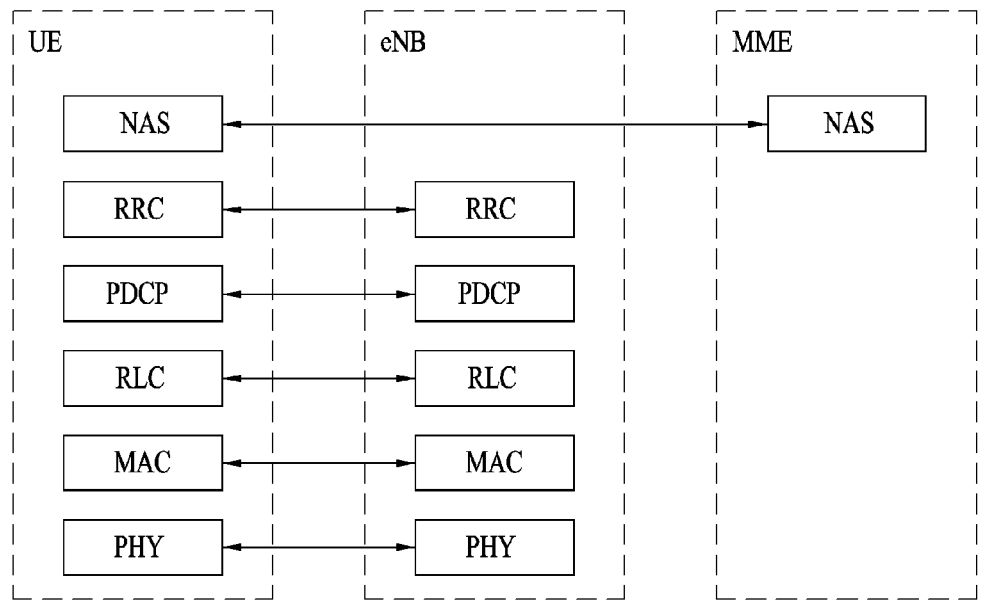
(a) control-plane protocol stack
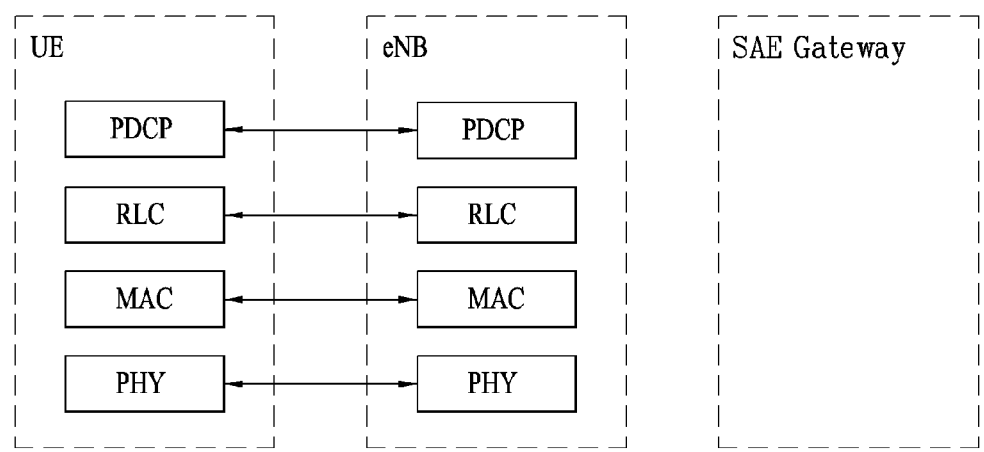
(b) user-plane protocol stack (a)  (b)

METHOD FOR SYNCHRONIZATION BETWEEN USER EQUIPMENT FOR DEVICE-TO-DEVICE (D2D) COMMUNICATION IN WIRELESS COMMUNICATION SYSTEM AND APPARATUS FOR SAME

CROSS REFERENCE TO RELATED APPLICATIONS

This application is the National Phase of PCT International Application No. PCT/KR2014/008650, filed on Sep. 17, 2014, which claims priority under 35 U.S.C. 119(e) to U.S. Provisional Application No. 61/883,204, filed on Sep. 27, 2013 and 61/895,412, filed on Oct. 25, 2013, all of which are hereby expressly incorporated by reference into the present application.

TECHNICAL FIELD

The present invention relates to a wireless communication system, and more particularly, to a method for synchronization between user equipments for D2D (device-to-device) communication in a wireless communication system and apparatus for the same.

BACKGROUND ART

A structure of a 3GPP LTE ($3^{rd}$ Generation Partnership Project Long Term Evolution; hereinafter, referred as "LTE") system which is an example of a wireless communication system to which the present invention may be applied will be described.

FIG. 1 illustrates a schematic structure a network structure of an evolved universal mobile telecommunication system (E-UMTS). An E-UMTS system is an evolved version of the UMTS system and basic standardization thereof is in progress under the 3rd Generation Partnership Project (3GPP). The E-UMTS is also referred to as a Long Term Evolution (LTE) system. For details of the technical specifications of the UMTS and E-UMTS, refer to Release 7 and Release 8 of "3rd Generation Partnership Project; Technical Specification Group Radio Access Network".

Referring to FIG. 1, the E-UMTS includes a User Equipment (UE), base stations (or eNBs or eNode Bs), and an Access Gateway (AG) which is located at an end of a network (E-UTRAN) and which is connected to an external network. Generally, an eNB can simultaneously transmit multiple data streams for a broadcast service, a multicast service and/or a unicast service.

One or more cells may exist for one BS. The cell provides a downlink or uplink transmission service to several UEs using any one of bandwidths of 1.4, 3, 5, 10, 15 and 20 MHz. Different cells may be set to provide different bandwidths. A BS controls data transmission or reception to or from a plurality of UEs. The BS transmits downlink scheduling information to a UE with respect to downlink (DL) data so as to inform the UE of time/frequency domain, coding, data size, Hybrid Automatic Repeat and reQuest (HARQ) associated information of data to be transmitted, or the like. The BS transmits uplink scheduling information to a UE with respect to uplink (UL) data so as to inform the UE of time/frequency domain, coding, data size, HARQ associated information used by the UE, or the like. An interface for transmitting user traffic or control traffic can be used between BSs. A Core Network (CN) may include the AG, a network node for user registration of the UE, or the like. The AG manages mobility of a UE on a Tracking Area (TA) basis. One TA includes a plurality of cells.

Wireless communication technology has been developed to reach the LTE based on Wideband Code Division Multiple Access (WCDMA), but demands and expectations of users and providers have continuously increased. In addition, since other aspects of wireless access technology continue to evolve, new advances are required to remain competitive in the future. There is a need for reduction in cost per bit, service availability increase, the use of a flexible frequency band, a simple structure and an open type interface, appropriate power consumption of a UE, etc.

DISCLOSURE OF THE INVENTION

Technical Task

The technical task of the present invention is to provide a synchronization method for D2D (device-to-device) communication in a wireless communication system and apparatus for the same.

It will be appreciated by persons skilled in the art that the objects that could be achieved with the present invention are not limited to what has been particularly described hereinabove and the above and other objects that the present invention could achieve will be more clearly understood from the following detailed description.

Technical Solutions

In a first technical aspect of the present invention, provided herein is a method of detecting a synchronization signal for D2D (device-to-device) communication by a user equipment in a wireless communication system, including detecting at least one synchronization signal repeatedly transmitted for the D2D communication in a synchronization signal transmission period for the D2D communication, wherein the at least one synchronization signal is configured with at least one synchronization sequence generated based on a first root index according to a synchronization reference ID (identifier).

Moreover, the synchronization signal transmission period for the D2D communication may be set to be longer than a synchronization signal transmission period for communication between a base station and the user equipment.

Moreover, the at least one synchronization sequence may be composed of only a same synchronization sequence.

Moreover, in each of the at least one synchronization signal, a synchronization sequence may be configured to be changed according to different time intervals.

Moreover, the at least one synchronization sequence may be assigned in the synchronization signal transmission period according to an offset set differently with respect to each of the at least one synchronization signal.

Moreover, in the at least one synchronization sequence, a plurality of same synchronization sequences may be assigned consecutively.

Moreover, the detecting the at least one synchronization sequence may include detecting one symbol from a symbol interval configured with consecutively assigned synchronization sequences.

Moreover, the at least one synchronization signal may include an end sequence for indicating a symbol boundary. Furthermore, the end sequence may be generated based on a second root index different from the first root index. Alternatively, the end sequence may be generated based on the first root index and a prescribed offset. In addition, the end sequence may have a length different from that of the at least one synchronization sequence.

Moreover, the at least one synchronization signal may be configured to have different phase rotation patterns according to time intervals. Furthermore, the phase rotation patterns may indicate at least one selected from the group consisting of a type of the D2D communication, a resource allocation scheme for the D2D communication, and an additional cell ID.

In a second technical aspect of the present invention, provided herein is a user equipment for detecting a synchronization signal for D2D (device-to-device) communication in a wireless communication system, including a radio frequency unit and a processor, wherein the processor is configured to detect at least one synchronization signal repeatedly transmitted for the D2D communication in a synchronization signal transmission period for the D2D communication and wherein the at least one synchronization signal is configured with at least one synchronization sequence generated based on a first root index according to a synchronization reference ID (identifier)

Advantageous Effects

According to the present invention, synchronization for D2D (device-to-device) communication can be efficiently performed in a wireless communication system.

The effects of the present invention are not limited to the above-described effects and other effects which are not described herein will become apparent to those skilled in the art from the following description.

DESCRIPTION OF DRAWINGS

The accompanying drawings, which are included to provide a further understanding of the invention, illustrate embodiments of the invention and together with the description serve to explain the principle of the invention.

FIG. 2 is a diagram showing the structure of a control plane and a user plane of a radio interface protocol between a User Equipment (UE) and an E-UTRAN based on the 3GPP radio access network standard.

BEST MODE FOR INVENTION

Figure 1:
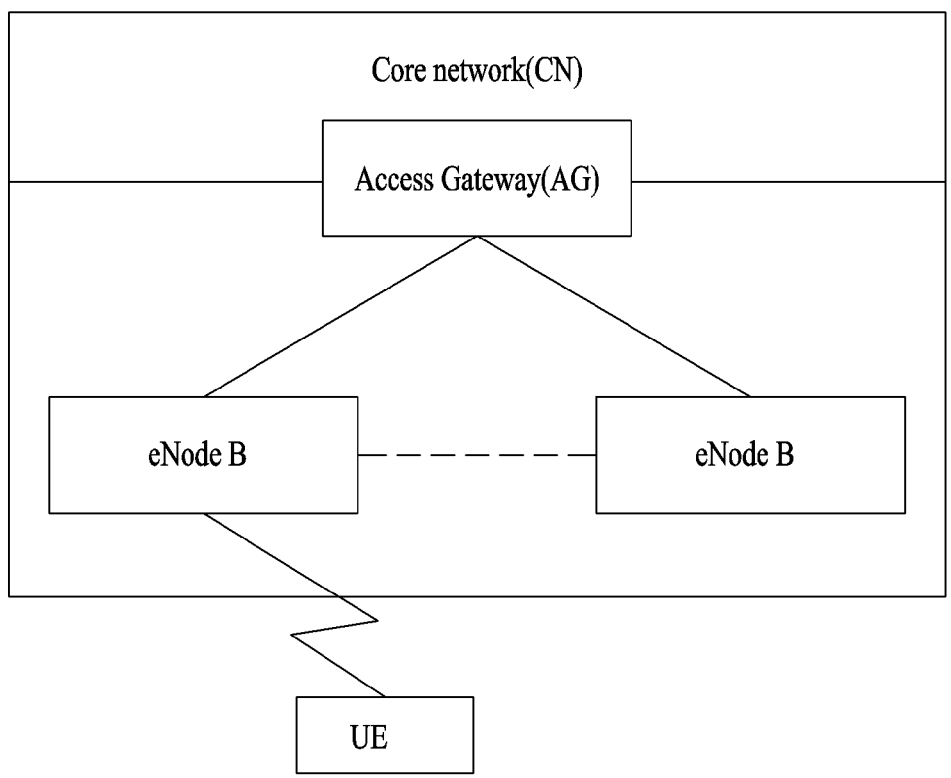
FIG. 1 is a schematic diagram showing a network architecture of an Evolved Universal Mobile Telecommunications System (E-UMTS) as an example of a mobile communication system.

The following technology may be used for various wireless access systems such as CDMA (code division multiple access), FDMA (frequency division multiple access), TDMA (time division multiple access), OFDMA (orthogonal frequency division multiple access), and SC-FDMA (single carrier frequency division multiple access). The CDMA may be implemented by the radio technology such as universal terrestrial radio access (UTRA) or CDMA2000. The TDMA may be implemented by the radio technology such as global system for mobile communications (GSM)/ general packet radio service (GPRS)/enhanced data rates for GSM evolution (EDGE). The OFDMA may be implemented by the radio technology such as IEEE 802.11 (Wi-Fi), IEEE 802.16 (WiMAX), IEEE 802.20, and evolved UTRA (E-UTRA). The UTRA is a part of a universal mobile telecommunications system (UMTS). A 3rd generation partnership project long term evolution (3GPP LTE) communication system is a part of an evolved UMTS (E-UMTS) that uses E-UTRA, and uses OFDMA in a downlink while uses SC-FDMA in an uplink. LTE-advanced (LTE-A) is an evolved version of the 3GPP LTE system.

Although the following description will be based on the 3GPP LTE system and the 3GPP LTE-A system to clarify description, it is to be understood that technical spirits of the present invention are not limited to the 3GPP LTE and the 3GPP LTE-A system.

FIG. 2 is a diagram showing the structure of a control plane and a user plane of a radio interface protocol between a UE and an E-UTRAN based on the 3GPP radio access network standard. The control plane refers to a path through which control messages used for managing a call by the UE and the E-UTRAN are transmitted. The user plane refers to a path through which data generated at an application layer, for example, voice data, Internet packet data or the like is transmitted.

The physical layer, which is the first layer, provides an information transfer service to a higher layer using a physical channel. The physical layer is connected with a medium access control (MAC) layer located at a higher level through a transport channel, and data is transferred between the MAC layer and the physical layer via the transport channel. Data is transferred between physical layers of a transmission side and a reception side via the physical channel. The physical channel uses time and frequency as radio resources. In detail, the physical channel is modulated using an Orthogonal Frequency Division Multiple Access (OFDMA)

scheme in downlink and is modulated using a Single Carrier Frequency Division Multiple Access (SC-FDMA) scheme in uplink.

The MAC layer of the second layer provides services to a radio link control (RLC) layer, which is a higher layer, via a logical channel. The RLC layer of the second layer enables reliable data transmission. The function of the RLC layer is included as the functional block of the MAC layer. A Packet Data Convergence Protocol (PDCP) layer of the second layer performs a header compression function that reduces the size of an Internet protocol (IP) packet header containing unnecessary control information having a relatively large size in order to efficiently transmit the IP packets such as IPv4 or IPv6 packets over a radio interface having a limited bandwidth.

Radio Resource Control (RRC) located at a lowest portion of the third layer is defined only in the control plane. The RRC layer handles logical channels, transport channels and physical channels for the configuration, re-configuration and release of Radio Bearers (RBs). Here, the RBs refer to services provided by the second layer, for data transfer between the UE and the network. The RRC layers of the UE and the network exchange RRC messages with each other. If the RRC layers of the UE and the network are RRC-connected, the UE is in an RRC connected mode and, if so not, is in an RRC idle mode. A Non-Access Stratum (NAS) layer located at a layer higher than the RRC layer performs a function such as session management and mobility management.

One cell configuring a base station (eNB) provides a downlink or uplink transmission service to several UEs using any one of bandwidths of 1.4, 3, 5, 10, 15 and 20 MHz. Different cells may be set to provide different bandwidths.

Examples of a downlink transport channel for transmitting data from the network to the UE include a Broadcast Channel (BCH) for transmitting system information, a Paging Channel (PCH) for transmitting a paging message, or a downlink Shared Channel (SCH) for transmitting user traffic or a control message. Traffic or a control message of a broadcast service or downlink multicast may be transmitted through the downlink SCH or a separate downlink Multicast Channel (MCH). Examples of an uplink transport channel for transmitting data from the UE to the network include a Random Access Channel (RACH) for transmitting an initial control message and an uplink SCH for transmitting user traffic or a control message. Examples of a logical channel located at a layer above the transport channel and mapped to the transport channel includes a Broadcast Control Channel (BCCH), a Paging Control Channel (PCCH), a Common Control Channel (CCCH), a Multicast Control Channel (MCCH), a Multicast Traffic Channel (MTCH), etc.

Figure 3:
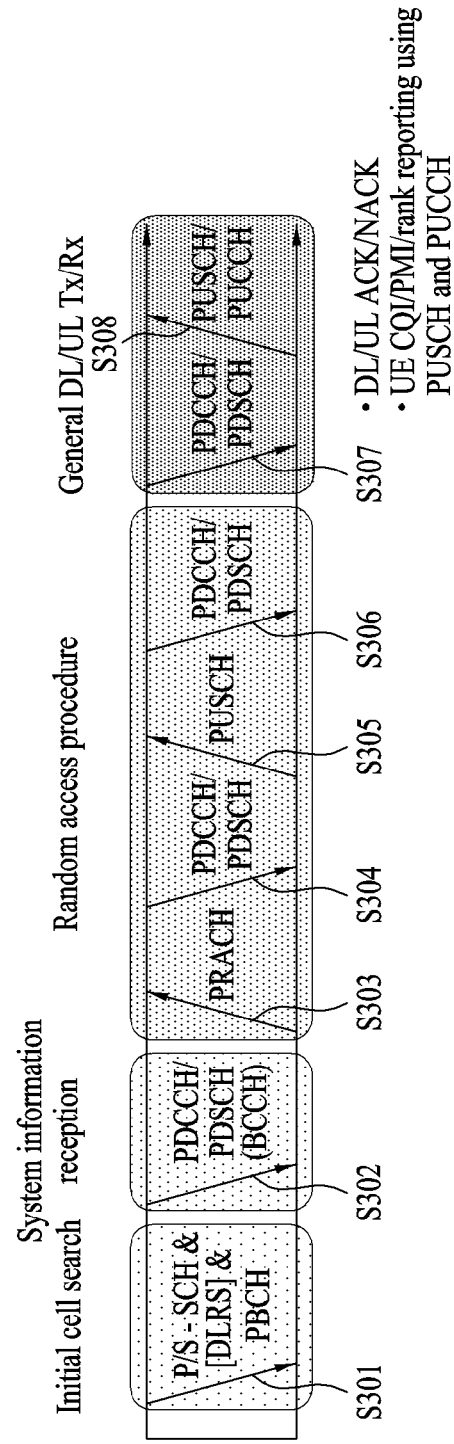
FIG. 3 is a diagram illustrating physical channels used in a 3GPP system and a general signal transmitting method using the same.

FIG. 3 is a diagram illustrating physical channels used in a 3GPP system and a general signal transmitting method using the same.

If a UE is powered on or newly enters a cell, the UE performs an initial cell search operation such as synchronization with a base station (S301). The UE receives a primary synchronization channel (P-SCH) and a secondary synchronization channel (S-SCH) from the base station so as to synchronize with the base station and to acquire information such as a cell ID. Thereafter, the UE may receive a physical broadcast channel from the base station so as to acquire a broadcast signal in the cell. The UE may receive a downlink reference signal (DL RS) so as to check a downlink channel state in the initial cell search step.

The UE, upon completion of initial cell search, may receive a Physical Downlink Control Channel (PDCCH) and a Physical Downlink Shared Channel (PDSCH) according to information carried in the PDCCH so as to acquire more detailed system information (S302).

Thereafter, the UE may perform a random access procedure such as steps S303 to S306 to complete the access to the base station. To this end, the UE may transmit a preamble through a physical random access channel (PRACH) (S303) and may receive a response message to the preamble through the PDCCH and the PDSCH corresponding to the PDCCH (S304). In case of a contention based random access, the UE may perform a contention resolution procedure such as transmission (S305) of additional PRACH and reception (S306) of the PDCCH and the PDSCH corresponding to the PDCCH.

After performing the above-described procedures, the user equipment may receive a Physical Downlink Control Channel (PDCCH)/Physical Downlink Shared Channel (PDSCH) (S307), as a general uplink/downlink signal transmission procedure, and may then perform Physical Uplink Shared Channel (PUSCH)/Physical Uplink Control Channel (PUCCH) transmission (S308). The control information being transmitted by the user equipment to the base station is collectively referred to as Uplink Control Information (UCI). The UCI includes HARQ ACK/NACK (Hybrid Automatic Repeat and reQuest Acknowledgement/Negative-ACK), SR (Scheduling Request), CSI (Channel State Information), and so on. In the description of the present invention, the HARQ ACK/NACK will simply be referred to as HARQ-ACK or ACK/NACK (A/N). Herein, the HARQ-ACK includes at least one of a positive ACK (simply referred to as ACK), a negative ACK (simply referred to as NACK), a DTX, and an NACK/DTX. The CSI includes CQI (Channel Quality Indicator), PMI (Precoding Matrix Indicator), RI (Rank Indication), and so on. The UCI is generally transmitted through the PUCCH. However, when control information and traffic data are to be transmitted at the same time, the UCI may also be transmitted through the PUSCH. Additionally, based upon a network request/indication, the UCI may be aperiodically transmitted through the PUSCH.

Figure 4:
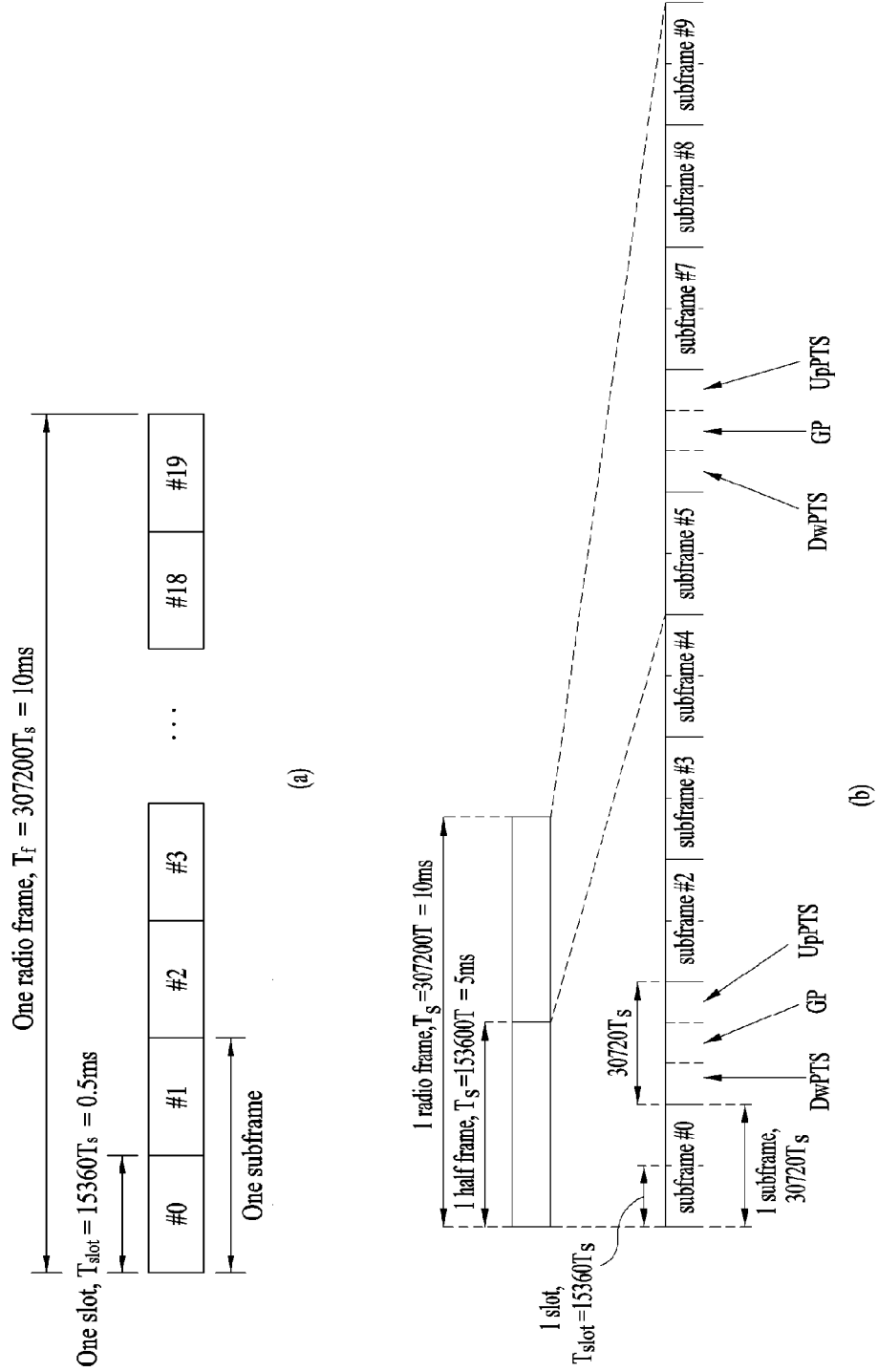
FIG. 4 illustrates exemplary radio frame structures in a LTE system.

FIG. 4 illustrates exemplary radio frame structures in a LTE system.

Referring to FIG. 4, in a cellular OFDM wireless packet communication system, an uplink/downlink data packet is transmitted on a eme basis and one subframe is defined as a predetermined time interval including a plurality of OFDM symbols. 3GPP LTE standard supports a type-1 radio frame structure applicable to frequency division duplex (FDD) and a type-2 radio frame structure applicable to time division duplex (TDD).

FIG. 4(a) illustrates the type-1 radio frame structure. A downlink radio frame is divided into 10 subframes. Each subframe is further divided into two slots in the time domain. A unit time during which one subframe is transmitted is defined as transmission time interval (TTI). For example, one subframe may be 1 ms in duration and one slot may be 0.5 ms in duration. A slot may include a plurality of orthogonal frequency division multiplexing (OFDM) symbols in the time domain and includes a plurality of resource blocks (RBs) in the frequency domain. Because the 3GPP LTE system adopts OFDMA for downlink, an OFDM symbol represents one symbol period. An OFDM symbol may be referred to as an SC-FDMA symbol or symbol period. A Resource Block (RB) is a resource allocation unit including a plurality of contiguous subcarriers in a slot.

The number of OFDM symbols included in one slot depends on cyclic prefix (CP) configuration. CP is divided into an extended CP and a normal CP. For example, when OFDM symbols are configured according to normal CP, the number of OFDM symbols included in one slot may be 7. When the OFDM symbols are configured according to extended CP, the duration of one OFDM symbol increases and thus the number of OFDM symbols included in one slot is smaller than the number of OFDM symbols included in one slot when the OFDM symbols are configured using the normal CP. In the extended CP case, the number of OFDM symbols included in one slot may be 6, for example. When a channel status is unstable, for example, when a UE moves at a high speed, the extended CP can be used to reduce inter-symbol interference.

When the normal CP is used, one slot includes 7 OFDM symbols, and thus one subframe includes 14 OFDM symbols. In this case, up to three OFDM symbols at the start of each subframe can be allocated to a physical downlink control channel (PDCCH) and the other three OFDM symbols can be allocated to a physical downlink shared channel (PD SCH).

FIG. 4(b) illustrates the type-2 radio frame structure. The type-2 radio frame includes two half frames each having 4 normal subframes and a special subframe including a downlink pilot time slot (DwPTS), a guard period (GP), and an uplink pilot time slot (UpPTS). Each normal subframe includes two slots.

In the special subframe, the DwPTS is used for initial cell search, synchronization, or channel estimation in a UE. The UpPTS is used for channel estimation in an eNB and uplink transmission synchronization in a UE. Thus, the DwPTS is used for downlink transmission and the UpPTS is used for uplink transmission. Especially, the UpPTS is used for transmission of a PRACH preamble or SRS. The GP is a period between a downlink and an uplink, for eliminating interference with the uplink caused by multi-path delay of a downlink signal.

In the current 3GPP standard document, the configuration of a special subframe is defined as shown below in Table 1. In Table 1, when $T_s=1/(15000\times2048)$, this indicates DwPTS and UpPTS, and the remaining area is set up as the guard period.

Meanwhile, in a Type 2 radio frame structure, more specifically, in a TDD system, an uplink/downlink subframe configuration (UL/DL configuration) is as shown below in Table 2.

TABLE 2

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 2, D indicates a downlink subframe, U indicates an uplink subframe, and S represents the special subframe. Additionally, in Table 2, downlink-uplink switching periodicity in the uplink/downlink subframe configuration of each system.

The aforementioned radio frame structure is purely exemplary and thus the number of subframes included in a radio frame, the number of slots included in a subframe, or the number of symbols included in a slot may vary.

Figure 5:
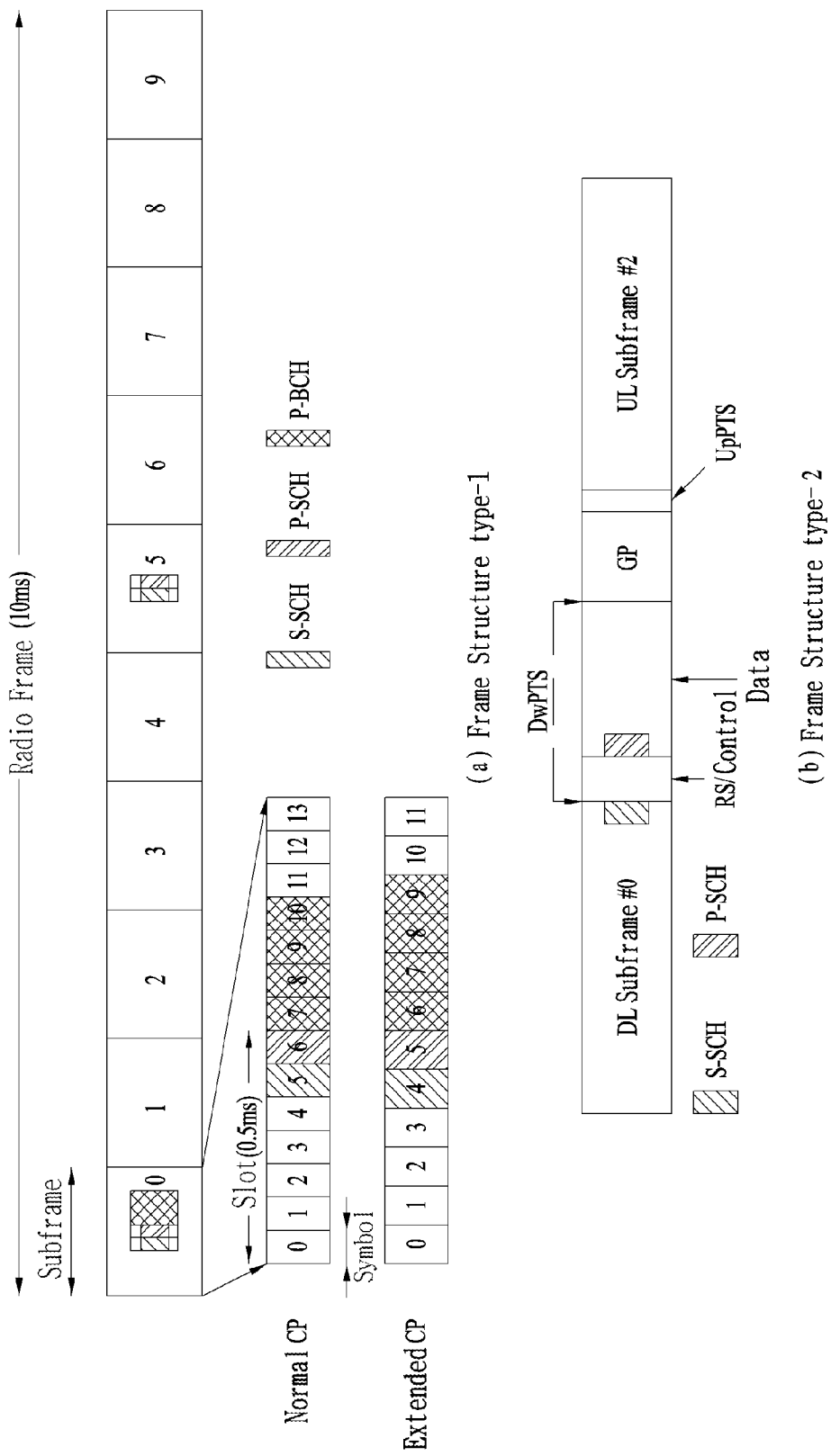
FIG. 5 is a diagram illustrating a general transmission and reception method using a paging message.

FIG. 5 illustrates a primary broadcast channel (P-BCH) and a synchronization channel (SCH). The SCH includes a primary synchronization channel (P-SCH) and a secondary synchronization channel (S-SCH). A primary synchronization signal (PSS) is transmitted on the P-SCH and a secondary synchronization signal (SSS) is transmitted on the S-SCH.

Referring to FIG. 5, in the frame structure type-1 (i.e., FDD), the P-SCH is located at a last OFDM symbol in each of slot #0 (i.e., a first slot of subframe #0) and slot #10 (i.e., a first slot of subframe #5) per radio frame. The S-SCH is located at a previous OFDM symbol before the last OFDM symbol in each of slot #0 and slot #10 per radio frame. The S-SCH and the P-SCH are located at neighboring OFDM symbols. In the frame structure type-2 (i.e., TDD), the P-SCH is transmitted through a third OFDM symbol in each of subframes #1 and #6. And, the S-SCH is located at a last OFDM symbol in each of slot #1 (i.e., a second slot of subframe #0) and slot #11 (i.e., a second slot of subframe #5). The P-BCH is transmitted in every four radio frames

TABLE 1

| | Normal cyclic prefix in downlink | | | Extended cyclic prefix in downlink | | |
|---|---|---|---|---|---|---|
| Special subframe configuration | DwPTS | UpPTS | | DwPTS | UpPTS | |
| | | Normal cyclic prefix in uplink | Extended cyclic prefix in uplink | | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — | irrespective of the frame structure type. And, the P-BCH is transmitted using the first to fourth OFDM symbols in the second slot of the subframe #0.

The P-SCH is transmitted using 72 subcarriers (10 subcarriers are reserved and 62 subcarriers are used for PSS transmission) based on a DC (direct current) subcarrier in a corresponding OFDM symbol. The S-SCH is transmitted using 72 subcarriers (10 subcarriers are reserved and 62 subcarriers are used for SSS transmission) based on a DC subcarrier in a corresponding OFDM symbol. The P-BCH is mapped to 72 subcarriers based on a DC subcarrier and four OFDM symbols in one subframe.

Figure 6:
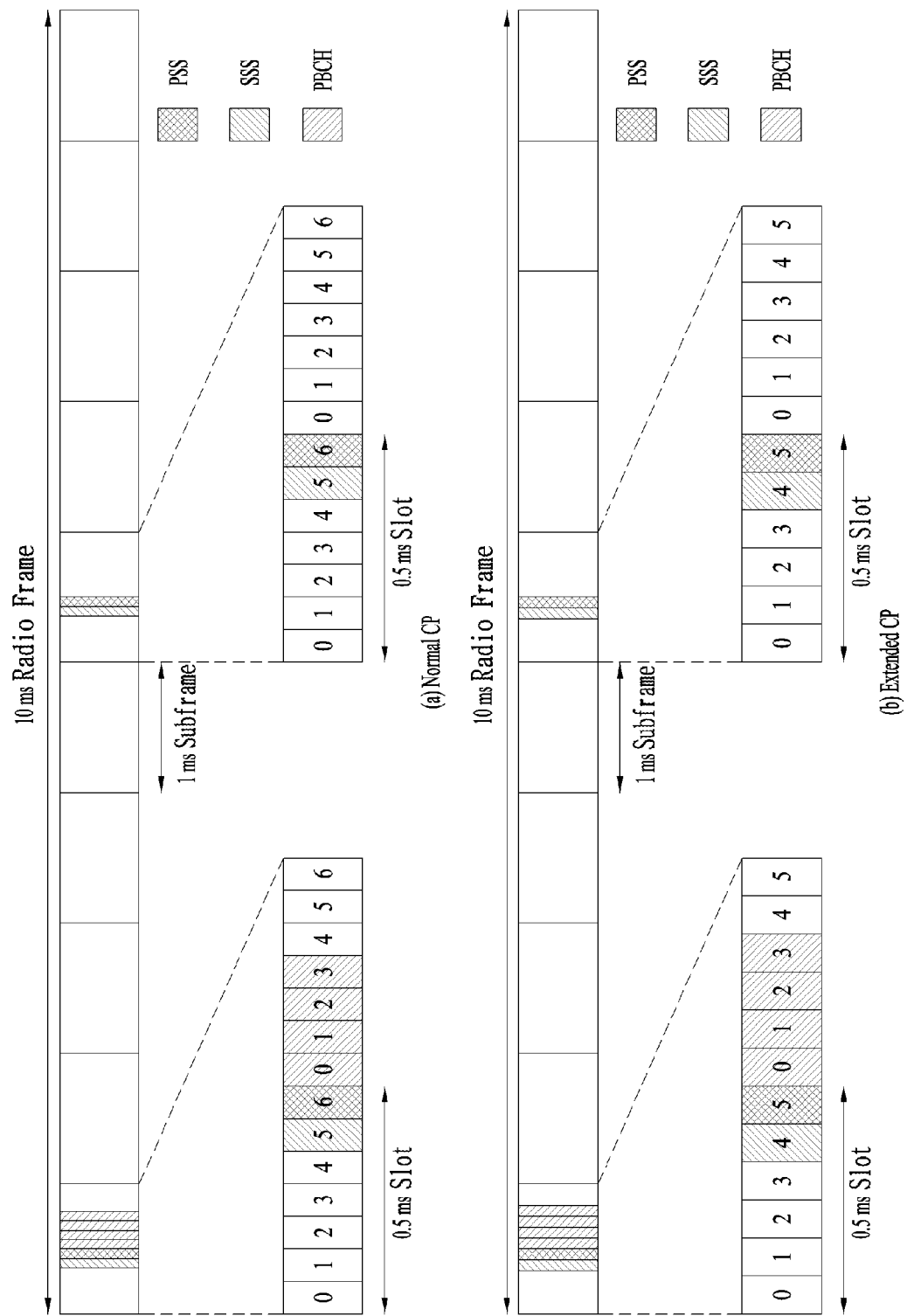
FIG. 6 is a diagram illustrating a scheme of transmitting MCCH (MBMS control channel) information.

FIG. 6 illustrates a radio frame structure for transmission of a synchronization signal (SS). Especially, FIG. 6 illustrates a radio frame structure for transmission of an SS and a PBCH in frequency division duplex (FDD), wherein FIG. 6(a) illustrates transmission locations of an SS and a PBCH in a radio frame configured with a normal cyclic prefix (CP) and FIG. 6(b) illustrates transmission locations of an SS and a PBCH in a radio frame configured with an extended CP.

If a UE is powered on or newly enters a cell, the UE performs an initial cell search procedure for obtaining time and frequency synchronization with the cell and detecting a physical cell identity of the cell. To this end, the UE may match synchronization with an eNB by receiving synchronization signals, e.g. a primary synchronization signal (PSS) and a secondary synchronization signal (SSS), from the eNB and then obtain information such as a cell identity (ID) and the like.

An SS will be described in more detail with reference to FIG. 3. An SS is categorized into a PSS and an SSS. The PSS is used to acquire time-domain synchronization such as OFDM symbol synchronization, slot synchronization, etc. and/or frequency-domain synchronization. And, the SSS is used to acquire frame synchronization, a cell group ID, and/or a CP configuration of a cell (i.e. information indicating whether to a normal CP or an extended is used). Referring to FIG. 6, a PSS and an SSS are transmitted through two OFDM symbols in each radio frame. Particularly, the SS is transmitted in first slot in each of subframe 0 and subframe 5 in consideration of a GSM (Global System for Mobile communication) frame length of 4.6 ms for facilitation of inter-radio access technology (inter-RAT) measurement. Especially, the PSS is transmitted in a last OFDM symbol in each of the first slot of subframe 0 and the first slot of subframe 5. And, the SSS is transmitted in a second to last OFDM symbol in each of the first slot of subframe 0 and the first slot of subframe 5. Boundaries of a corresponding radio frame may be detected through the SSS. The PSS is transmitted in the last OFDM symbol of the corresponding slot and the SSS is transmitted in the OFDM symbol immediately before the OFDM symbol in which the PSS is transmitted. According to a transmission diversity scheme for the SS, only a single antenna port is used. However, the transmission diversity scheme for the SS standards is not separately defined in the current standard. In other words, a single antenna port transmission scheme or a transmission scheme transparent to a UE (e.g. precoding vector switching (PVS), time switched transmit diversity (TSTD), or cyclic delay diversity (CDD)) can be adopted for transmission diversity of the SS.

The SS can represent total 504 unique physical layer cell IDs through combinations of 3 PSSs and 168 SSSs. In other words, the physical layer cell IDs are grouped into 168 physical layer cell ID groups each including three unique IDs so that each physical layer cell ID is a part of only one physical layer cell ID group. Thus, a physical layer cell ID $N^{cell}_{ID}$ is uniquely defined with a number $N^{(1)}_{ID}$ in the range of 0 to 167 indicating a physical layer cell ID group and a number $N^{(2)}_{ID}$ from 0 to 2 indicating a physical layer ID in the physical layer cell ID group (i.e., $N^{cell}_{ID}=3N^{(1)}_{ID}+N^{(2)}_{ID}$). A UE can obtain one of the three unique physical layer IDs by detecting the PSS and then identify one, which is associated with the physical layer ID, among the 168 physical layer cell IDs in a manner of detecting the SSS. A Zadoff-Chu (ZC) sequence of length 63 is defined in a frequency domain and the sequence is used as the PSS. For example, the ZC sequence can be defined according to Equation 1 below.

$$d_u(n) = e^{-j\frac{\pi u n(n+1)}{N_{ZC}}} \quad \text{[Equation 1]}$$

In Equation 1, $N_{ZC}=63$ and a sequence element corresponding to a DC subcarrier, n=31, is punctured.

The PSS is mapped to 6 RBs (=72 subcarriers) adjacent to a center frequency. Among the 72 subcarriers, 9 remaining subcarriers carry a value of 0 at all times and serve as elements facilitating filter design for performing synchronization. In order to define total three PSSs, u=24, u=29, and u=34 are used in Equation 1. Since u=24 an u=34 have a conjugate symmetry relation, two correlations may be simultaneously performed. In this case, the conjugate symmetry means the relationship in Equation 2 below.

$d_u(n)=(-1)^n(d_{N_{ZC}-u}(n))^*$, when $N_{ZC}$ is even number $d_u(n)=(d_{N_{ZC}-u}(n))^*$, when $N_{ZC}$ is odd number  [Equation 2]

A one-shot correlator for u=29 and u=34 can be implemented using conjugate symmetry characteristics. Moreover, compared to a case without the conjugate symmetry, the total amount of calculation can be reduced by about 33.3%.

In more detail, a sequence d(n) used for the PSS can be generated from a frequency-domain ZC sequence according to Equation 3 below.

$$d_u(n) = \begin{cases} e^{-j\frac{\pi u n(n+1)}{63}} & n = 0, 1, \ldots, 30 \\ e^{-j\frac{\pi u(n+1)(n+2)}{63}} & n = 31, 32, \ldots, 61 \end{cases} \quad \text{[Equation 3]}$$

In Equation 3, a ZC root sequence index u can be given according to Table 3 below.

TABLE 3

| $N^{(2)}_{ID}$ | Root index u |
|---|---|
| 0 | 25 |
| 1 | 29 |
| 2 | 34 |

Referring to FIG. 6, by detecting the PSS, a UE may know that a corresponding subframe is one of subframe 0 and subframe 5 since the PSS is transmitted every 5 ms but the UE cannot know whether the subframe is subframe 0 or subframe 5. In other words, the UE cannot recognize boundaries of a radio frame only through the PSS. That is, frame synchronization cannot be obtained only from the PSS. The UE detects the boundaries of the radio frame in a manner of detecting an SSS which is transmitted twice in one radio frame with different sequences.

Figure 7:
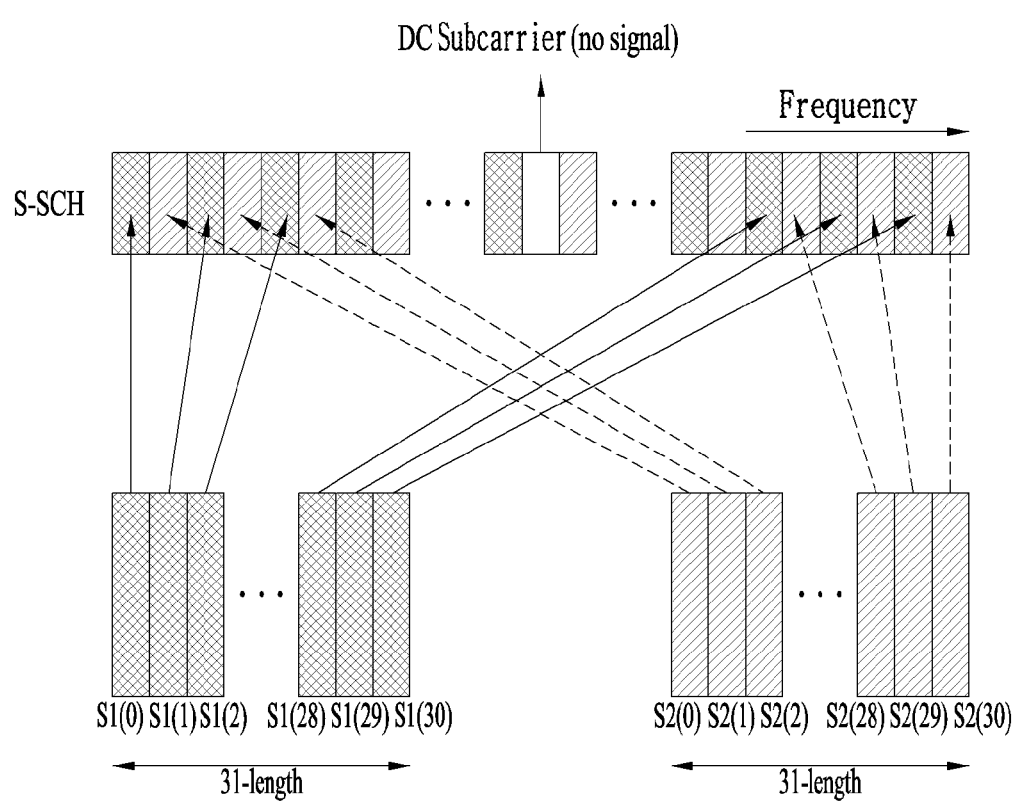
FIG. 7 is a diagram showing a resource grid for a downlink slot.

FIG. 7 is a diagram for explaining a scheme of generating a secondary synchronization signal (SSS). In particular, FIG. 7 illustrates a mapping relation of two sequences between a logical domain and a physical domain.

A sequence used for the SSS corresponds to an interleaved concatenation of two m-sequences each of length 31. The concatenated sequence is scrambled by a scrambling sequence given by the PSS. In this case, the m-sequence is a kind of a pseudo noise (PN) sequence.

Referring to FIG. 7, if two m-sequences used for generating an SSS code are denoted by S1 and S2 respectively, then two different PSS-based sequences S1 and S2 are scrambled into the SSS. In this case, S1 and S2 are scrambled by different sequences. A PSS-based scrambling code may be obtained by cyclically shifting an m-sequence generated from a polynomial of $x^5+x^3+1$. Depending on a PSS index, 6 sequences are generated by the cyclic shift of the m-sequence. Subsequently, S2 is scrambled by an S1-based scrambling code. The S1-based scrambling code may be obtained by cyclically shifting an m-sequence generated from a polynomial of $x^5+x^4+x^2+x^1+1$. Depending on an S1 index, 8 sequences are generated by the cyclic shift of the m-sequence. The SSS code is swapped every 5 ms, whereas the PSS-based scrambling code is not swapped. For example, assuming that an SSS of subframe 0 carries a cell group ID through a combination of (S1, S2), an SSS of subframe 5 carries a sequence swapped as (S2, S1). Thus, boundaries of a radio frame of 10 ms can be discerned. The SSS code used in this case is generated based on a polynomial of $x^5+x^2+1$. And, total 31 codes can be generated through different cyclic shifts of an m-sequence of length 31.

A combination of two m-sequences, each of which has length 31, used for defining the SSS differs in subframe 0 and subframe 5. Total 168 cell group IDs are represented according to a combination of the two m-sequences each of length 31. The m-sequences used as sequences for the SSS have a robust property in a frequency selective environment. In addition, since the m-sequences can be transformed by high-speed m-sequence transform that uses fast Hadamard transform, if the m-sequences are utilized for the SSS, the amount of calculation necessary for a UE to interpret the SSS can be reduced. Moreover, since the SSS is composed of two short codes, the amount of calculation of the UE can also be reduced.

Generation of the SSS is described in more detail. Sequences of d(0), . . . , d(61) used for the SSS are an interleaved concatenation of two binary sequences, each of which has length 31. The concatenated sequence is scrambled by a sequence given by the PSS.

A combination of two sequences, each of which has length 31, used for defining the PSS can be different in subframe 0 and subframe 5 according to Equation 4.

$$d(2n) = \begin{cases} s_0^{(m_0)}(n)c_0(n) & \text{in subframe 0} \\ s_1^{(m_1)}(n)c_0(n) & \text{in subframe 5} \end{cases}$$ [Equation 4]

$$d(2n+1) = \begin{cases} s_1^{(m_1)}(n)c_1(n)z_1^{(m_0)}(n) & \text{in subframe 0} \\ s_0^{(m_0)}(n)c_1(n)z_1^{(m_1)}(n) & \text{in subframe 5} \end{cases}$$

In Equation 4, $0 \leq n \leq 30$. Indices $m_0$ and $m_1$ are derived from the physical layer cell identity group $N^{(1)}_{ID}$ according to Equation 5.

$$m_0 = m' \bmod 31$$
$$m_1 = (m_0 + \lfloor m'/31 \rfloor + 1) \bmod 31$$
$$m' = N^{(1)}_{ID} + q(q+1)/2,$$
$$q = \left\lfloor \frac{N^{(1)}_{ID} + q'(q'+1)/2}{30} \right\rfloor,$$
$$q' = \lfloor N^{(1)}_{ID}/30 \rfloor$$ [Equation 5]

The output in Equation 5 will be listed in Table 4 after Equation 11.

Two sequences $S^{(m_0)0}(n)$ and $S^{(m_1)1}(n)$ are defined as two different cyclic shifts of an m-sequence $s(n)$ according to Equation 6.

$$s_0^{(m_0)}(n) = s((n+m_0) \bmod 31)$$
$$s_1^{(m_1)}(n) = s((n+m_1) \bmod 31)$$ [Equation 6]

In Equation 6, $s(i) = 1 - 2x(i)$ (where $0 \leq i \leq 30$) is defined according to Equation 7 with initial conditions $x(0)=0$, $x(1)=0$, $x(2)$, $x(3)=0$, and $x(4)=1$.

$$x(\bar{i}+5) = (x(\bar{i}+3) + x(\bar{i})) \bmod 2, \, 0 \leq \bar{i} \leq 25$$ [Equation 7]

Two scrambling sequences $c_0(n)$ and $c_1(n)$ depend on the PSS and are defined by two different cyclic shifts of an m-sequence $c(n)$ according to Equation 8.

$$c_0(n) = c((n+N_{ID}^{(2)})) \bmod 31)$$
$$c_1(n) = c((n+N_{ID}^{(2)}+3) \bmod 31)$$ [Equation 8]

In Equation 8, $N^{(2)}_{ID} \in \{0, 1, 2,\}$ is a physical layer identity in the physical layer cell identity group $N^{(1)}_{ID}$ and $c(i) = 1 - 2x(i)$ (where $0 \leq i \leq 30$) is defined according to Equation 9 with initial conditions $x(0)=0$, $x(1)=0$, $x(2)$, $x(3)=0$, and $x(4)=1$.

$$x(\bar{i}+5) = (x(\bar{i}+3) + x(\bar{i})) \bmod 2, \, 0 \leq \bar{i} \leq 25$$ [Equation 9]

Scrambling sequences $z^{(m_0)1}(n)$ and $z^{(m_1)1}(n)$ are defined by cyclic shifts of an m-sequence $z(n)$ according to Equation 10.

$$z_1^{(m_0)}(n) = z((n+(m_0 \bmod 8)) \bmod 31)$$
$$z_1^{(m_1)}(n) = z((n+(m_1 \bmod 8)) \bmod 31)$$ [Equation 10]

In Equation 10, $m_0$ and $m_1$ are obtained from Table 4 after Equation 11 and $z(i) = 1 - 2x(i)$ (where $0 \leq i \leq 30$) is defined according to Equation 11 with initial conditions $x(0)=0$, $x(1)=0$, $x(2)$, $x(3)=0$, and $x(4)=1$.

$$x(\bar{i}+5) = (x(\bar{i}+4) + x(\bar{i}+2) + x(\bar{i}+1) + x(\bar{i})) \bmod 2, \, 0 \leq \bar{i} \leq 25$$ [Equation 11]

TABLE 4

| $N^{(1)}_{ID}$ | $m_0$ | $m_1$ |
| --- | --- | --- |
| 0 | 0 | 1 |
| 1 | 1 | 2 |
| 2 | 2 | 3 |
| 3 | 3 | 4 |
| 4 | 4 | 5 |
| 5 | 5 | 6 |
| 6 | 6 | 7 |
| 7 | 7 | 8 |
| 8 | 8 | 9 |

TABLE 4-continued

| $N^{(1)}_{ID}$ | $m_0$ | $m_1$ |
|---|---|---|
| 9 | 9 | 10 |
| 10 | 10 | 11 |
| 11 | 11 | 12 |
| 12 | 12 | 13 |
| 13 | 13 | 14 |
| 14 | 14 | 15 |
| 15 | 15 | 16 |
| 16 | 16 | 17 |
| 17 | 17 | 18 |
| 18 | 18 | 19 |
| 19 | 19 | 20 |
| 20 | 20 | 21 |
| 21 | 21 | 22 |
| 22 | 22 | 23 |
| 23 | 23 | 24 |
| 24 | 24 | 25 |
| 25 | 25 | 26 |
| 26 | 26 | 27 |
| 27 | 27 | 28 |
| 28 | 28 | 29 |
| 29 | 29 | 30 |
| 30 | 0 | 2 |
| 31 | 1 | 3 |
| 32 | 2 | 4 |
| 33 | 3 | 5 |
| 34 | 4 | 6 |
| 35 | 5 | 7 |
| 36 | 6 | 8 |
| 37 | 7 | 9 |
| 38 | 8 | 10 |
| 39 | 9 | 11 |
| 40 | 10 | 12 |
| 41 | 11 | 13 |
| 42 | 12 | 14 |
| 43 | 13 | 15 |
| 44 | 14 | 16 |
| 45 | 15 | 17 |
| 46 | 16 | 18 |
| 47 | 17 | 19 |
| 48 | 18 | 20 |
| 49 | 19 | 21 |
| 50 | 20 | 22 |
| 51 | 21 | 23 |
| 52 | 22 | 24 |
| 53 | 23 | 25 |
| 54 | 24 | 26 |
| 55 | 25 | 27 |
| 56 | 26 | 28 |
| 57 | 27 | 29 |
| 58 | 28 | 30 |
| 59 | 0 | 3 |
| 60 | 1 | 4 |
| 61 | 2 | 5 |
| 62 | 3 | 6 |
| 63 | 4 | 7 |
| 64 | 5 | 8 |
| 65 | 6 | 9 |
| 66 | 7 | 10 |
| 67 | 8 | 11 |
| 68 | 9 | 12 |
| 69 | 10 | 13 |
| 70 | 11 | 14 |
| 71 | 12 | 15 |
| 72 | 13 | 16 |
| 73 | 14 | 17 |
| 74 | 15 | 18 |
| 75 | 16 | 19 |
| 76 | 17 | 20 |
| 77 | 18 | 21 |
| 78 | 19 | 22 |
| 79 | 20 | 23 |
| 80 | 21 | 24 |
| 81 | 22 | 25 |
| 82 | 23 | 26 |
| 83 | 24 | 27 |
| 84 | 25 | 28 |
| 85 | 26 | 29 |
| 86 | 27 | 30 |
| 87 | 0 | 4 |
| 88 | 1 | 5 |
| 89 | 2 | 6 |
| 90 | 3 | 7 |
| 91 | 4 | 8 |
| 92 | 5 | 9 |
| 93 | 6 | 10 |
| 94 | 7 | 11 |
| 95 | 8 | 12 |
| 96 | 9 | 13 |
| 97 | 10 | 14 |
| 98 | 11 | 15 |
| 99 | 12 | 16 |
| 100 | 13 | 17 |
| 101 | 14 | 18 |
| 102 | 15 | 19 |
| 103 | 16 | 20 |
| 104 | 17 | 21 |
| 105 | 18 | 22 |
| 106 | 19 | 23 |
| 107 | 20 | 24 |
| 108 | 21 | 25 |
| 109 | 22 | 26 |
| 110 | 23 | 27 |
| 111 | 24 | 28 |
| 112 | 25 | 29 |
| 113 | 26 | 30 |
| 114 | 0 | 5 |
| 115 | 1 | 6 |
| 116 | 2 | 7 |
| 117 | 3 | 8 |
| 118 | 4 | 9 |
| 119 | 5 | 10 |
| 120 | 6 | 11 |
| 121 | 7 | 12 |
| 122 | 8 | 13 |
| 123 | 9 | 14 |
| 124 | 10 | 15 |
| 125 | 11 | 16 |
| 126 | 12 | 17 |
| 127 | 13 | 18 |
| 128 | 14 | 19 |
| 129 | 15 | 20 |
| 130 | 16 | 21 |
| 131 | 17 | 22 |
| 132 | 18 | 23 |
| 133 | 19 | 24 |
| 134 | 20 | 25 |
| 135 | 21 | 26 |
| 136 | 22 | 27 |
| 137 | 23 | 28 |
| 138 | 24 | 29 |
| 139 | 25 | 30 |
| 140 | 0 | 6 |
| 141 | 1 | 7 |
| 142 | 2 | 8 |
| 143 | 3 | 9 |
| 144 | 4 | 10 |
| 145 | 5 | 11 |
| 146 | 6 | 12 |
| 147 | 7 | 13 |
| 148 | 8 | 14 |
| 149 | 9 | 15 |
| 150 | 10 | 16 |
| 151 | 11 | 17 |
| 152 | 12 | 18 |
| 153 | 13 | 19 |
| 154 | 14 | 20 |
| 155 | 15 | 21 |
| 156 | 16 | 22 |
| 157 | 17 | 23 |
| 158 | 18 | 24 |
| 159 | 19 | 25 |
| 160 | 20 | 26 |
| 161 | 21 | 27 |
| 162 | 22 | 28 |
| 163 | 23 | 29 |
| 164 | 24 | 30 |

TABLE 4-continued

| $N^{(1)}_{ID}$ | $m_0$ | $m_1$ |
| --- | --- | --- |
| 165 | 0 | 7 |
| 166 | 1 | 8 |
| 167 | 2 | 9 |
| — | — | — |
| — | — | — |

Having demodulated a DL signal by performing a cell search procedure using the SSS and determined time and frequency parameters necessary to perform UL signal transmission at an accurate time, a UE can communicate with an eNB only after obtaining system information necessary for a system configuration of the UE from the eNB.

The system information is configured with a master information block (MIB) and system information blocks (SIBs). Each SIB includes a set of functionally related parameters and is categorized into an MIB, SIB Type 1 (SIB 1), SIB Type 2 (SIB2), and SIB3 to SIB8 according to the included parameters. The MIB includes most frequently transmitted parameters which are essential for a UE to initially access a network served by an eNB. The SIB1 includes not only information on time-domain scheduling for other SIBs but also parameters necessary to determine whether a specific cell is suitable in cell selection.

The UE may receive the MIB through a broadcast channel (e.g. a PBCH). The MIB includes a downlink system bandwidth (DL BW), a PHICH configuration, and a system frame number (SFN). Thus, the UE can explicitly know information on the DL BW, SFN, and PHICH configuration by receiving the PBCH. On the other hand, the UE may implicitly know information on the number of transmission antenna ports of the eNB. The information on the number of the transmission antennas of the eNB is implicitly signaled by masking (e.g. XOR operation) a sequence corresponding to the number of the transmission antennas to 16-bit CRC (cyclic redundancy check) used in detecting an error of the PBCH.

The PBCH is mapped to four subframes during 40 ms. The time of 40 ms is for blind detection and there is no explicit signaling for the time of 40 ms. In the time domain, the PBCH is transmitted in OFDM symbols 0 to 3 of slot 1 in subframe 0 (i.e., the second slot of subframe 0) of a radio frame.

In the frequency domain, PSS/SSS and PBCH are transmitted irrespective of an actual system bandwidth in total 6 RBs, i.e., 3 RBs in the left side and 3 RBs in the right side with reference to a DC subcarrier within a corresponding OFDM symbol. In other words, the PSS/SSS and the PBCH are transmitted only in 72 subcarriers. Therefore, a UE is configured to detect or decode the SS and the PBCH irrespective of a downlink transmission bandwidth configured for the UE.

Having accessed the network served by the eNB after completing the initial cell search, the UE is able to obtain more detailed system information by receiving PDCCH and PDSCH according to information carried on the PDCCH. After performing the above-described procedure, the UE may perform PDCCH/PDSCH reception and PUSCH/PUCCH transmission as a general UL/DL signal transmission procedure.

Figure 8:
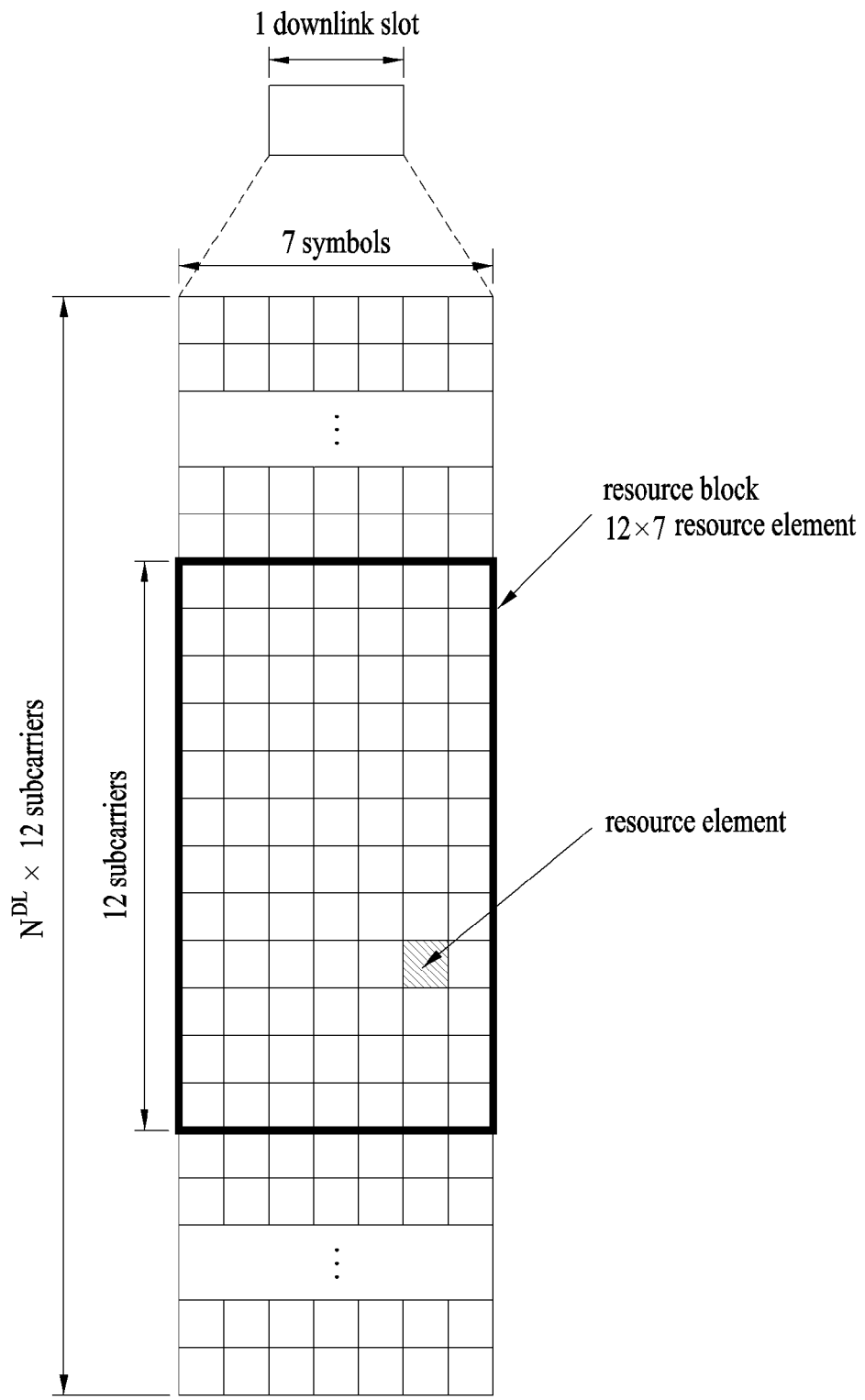
FIG. 8 illustrates an example of a downlink subframe structure.

FIG. 8 illustrates a resource grid for a downlink slot.

Referring to FIG. 8, a downlink slot includes $N_{symb}^{DL}$ OFDM symbols in a time domain and $N_{RB}^{DL}$ resource blocks in a frequency domain. Since each resource block includes $N_{SC}^{RB}$ subcarriers, the downlink slot includes $N_{RB}^{DL} \times N_{SC}^{RB}$ subcarriers in the frequency domain. Although FIG. 8 illustrates that the downlink slot includes 7 OFDM symbols and the resource block includes 12 subcarriers, it is to be understood that the present invention is not limited thereto. For example, the number of OFDM symbols included in the downlink slot may be changed depending on a length of CP (cyclic prefix).

Each element on a resource grid is referred to as a resource element (RE). One resource element is indicated by one OFDM symbol index and one subcarrier index. One RB includes $N_{symb}^{DL} = N_{sc}^{RB}$ resource elements. The number $N_{RB}^{DL}$ of resource blocks included in the downlink slot depends on a downlink transmission bandwidth configured in a cell.

Figure 9:
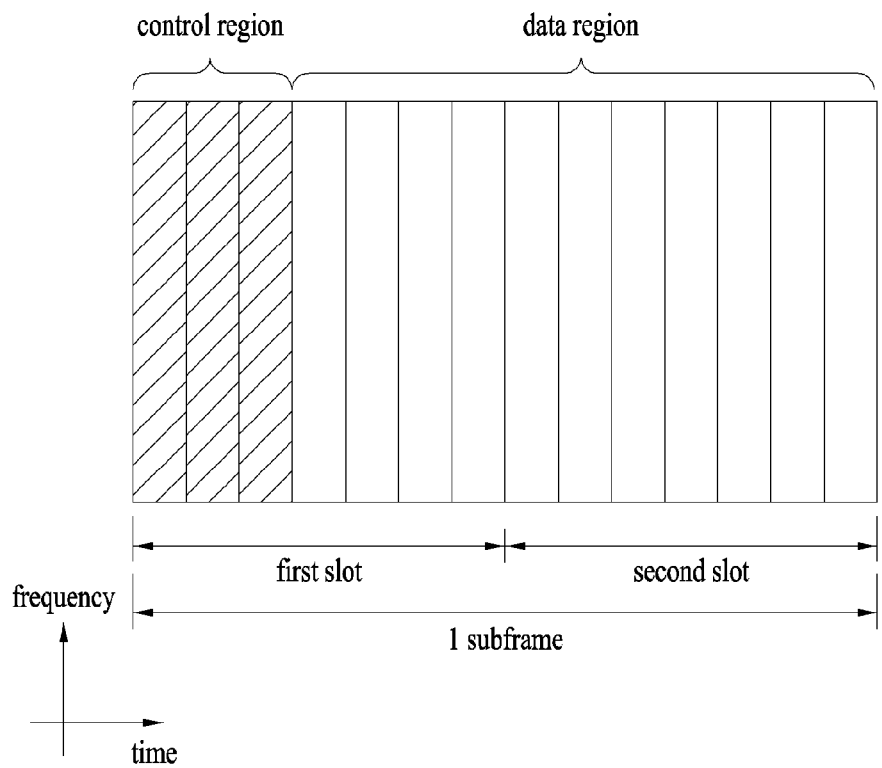
FIG. 9 is a diagram showing a structure of an uplink subframe used in LTE.

FIG. 9 illustrates a downlink subframe structure.

Referring to FIG. 9, up to three (or four) OFDM symbols at the start of the first slot in a downlink subframe are used for a control region to which control channels are allocated and the other OFDM symbols of the downlink subframe are used for a data region to which a PDSCH is allocated. Downlink control channels used in LTE include a physical control format indicator channel (PCFICH), a physical downlink control channel (PDCCH), and a physical hybrid automatic repeat request (ARQ) indicator channel (PHICH). The PCFICH is located in the first OFDM symbol of a subframe, carrying information about the number of OFDM symbols used for transmission of control channels in the subframe. The PHICH delivers a HARQ acknowledgment/negative acknowledgment (ACK/NACK) signal in response to an uplink transmission.

Control information carried on the PDCCH is called downlink control information (DCI). The DCI includes uplink resource allocation information and other control information for an UE or an UE group. For example, the DCI includes downlink/uplink scheduling information, an uplink transmit (Tx) power control command, and etc.

The PDCCH carries transmission format and resource allocation information of a downlink shared channel (DL-SCH), transmission format and resource allocation information of an uplink shared channel (UL-SCH), paging information on a paging channel (PCH), system information on the DL-SCH, resource allocation information of an upper layer control message such as a random access response transmitted on the PDSCH, a set of Tx power control commands for individual UEs in a UE group, Tx power control command, activity indication information of voice over Internet protocol (VoIP), and the like. A plurality of PDCCHs can be transmitted in the control region. The UE is able to monitor a plurality of the PDCCHs. The PDCCH is transmitted on aggregation of one or a plurality of consecutive control channel elements (CCEs). The CCE is a logic allocation unit used to provide the PDCCH with a coding rate based on a radio channel state. The CCE corresponds to a plurality of resource element groups (REGs). The format of the PDCCH and the number of bits of the PDCCH are determined according to the number of CCEs. An eNB determines the PDCCH format according to the DCI to be transmitted to a UE and attaches cyclic redundancy check (CRC) to the control information. The CRC is masked with an identifier (e.g., radio network temporary identifier (RNTI)) depending on usage of the PDCCH or an owner of the PDCCH. For instance, if the PDCCH is for a specific UE, the CRC may be masked with an identifier (e.g., cell-RNTI (C-RNTI)) of the corresponding UE. If the PDCCH is for a paging message, the CRC may be masked with a paging identifier (e.g., paging-RNTI (P-RNTI)). If the PDCCH is for system information (more particularly, system information block (SIB)), the CRC may be masked with a system information RNTI (SI-RNTI). If the PDCCH is for a random access response, the CRC may be masked with a random access RNTI (RA-RNTI).

Figure 10:
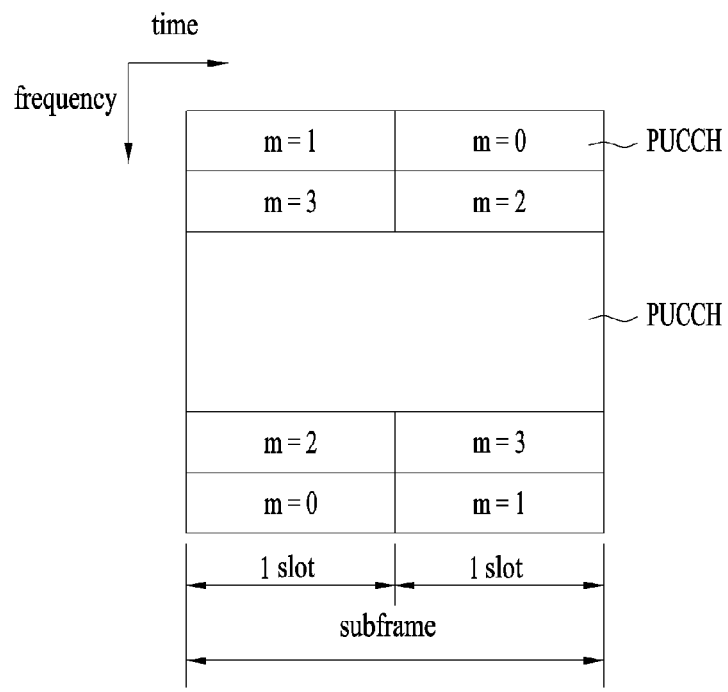
FIGS. 10 and 11 illustrate D2D communication.

FIG. 10 illustrates a structure of an uplink subframe used in LTE.

Referring to FIG. 10, an uplink subframe includes a plurality (e.g., 2) of slots. The number of SC-FDMA symbols included in the slot may vary depending on the CP length. The uplink subframe is divided into a control region and a data region in a frequency domain. The data region includes a PUSCH and is used to transmit a data signal such as voice. The control region includes a PUCCH and is used to transmit uplink control information (UCI). The PUCCH includes an RB pair located at both ends of the data region on a frequency axis and is hopped at a slot boundary.

The PUCCH can be used to transmit the following control information.

SR (scheduling request): Information used to request UL-SCH resources. This is transmitted using an on-off keying (OOK) scheme.

HARQ ACK/NACK: Response signal with respect to a downlink data packet on PDSCH. This indicates whether the downlink data packet is successfully received. 1-bit ACK/NACK is transmitted in response to a single downlink codeword and 2-bit ACK/NACK is transmitted in response to two downlink codewords.

CSI (channel state information): Feedback information with respect to a downlink channel. The CSI includes a channel quality indicator (CQI) and MIMO-related (multiple input multiple output) feedback information includes a rank indicator (RI), a precoding matrix indicator (PMI) and a precoding type indicator (PTI). 20 bits are used in each subframe.

The amount of UCI that can be transmitted in a subframe by a UE depends on the number of SC-FDMA symbols available for control information transmission. The SC-FDMA symbols available for control information transmission mean the remaining SC-FDMA symbols except SC-FDMA symbols for reference signal transmission in a subframe. In case of a subframe having a sounding reference signal (SRS) configured therein, a last SC-FDMA symbol of the subframe is also excluded. The reference signal is used for coherent detection of the PUCCH.

When D2D communication is introduced in the aforementioned wireless communication system (e.g., 3GPP LTE system or 3GPP LTE-A system), specific methods for performing the D2D communication are described hereinafter.

Figure 11:
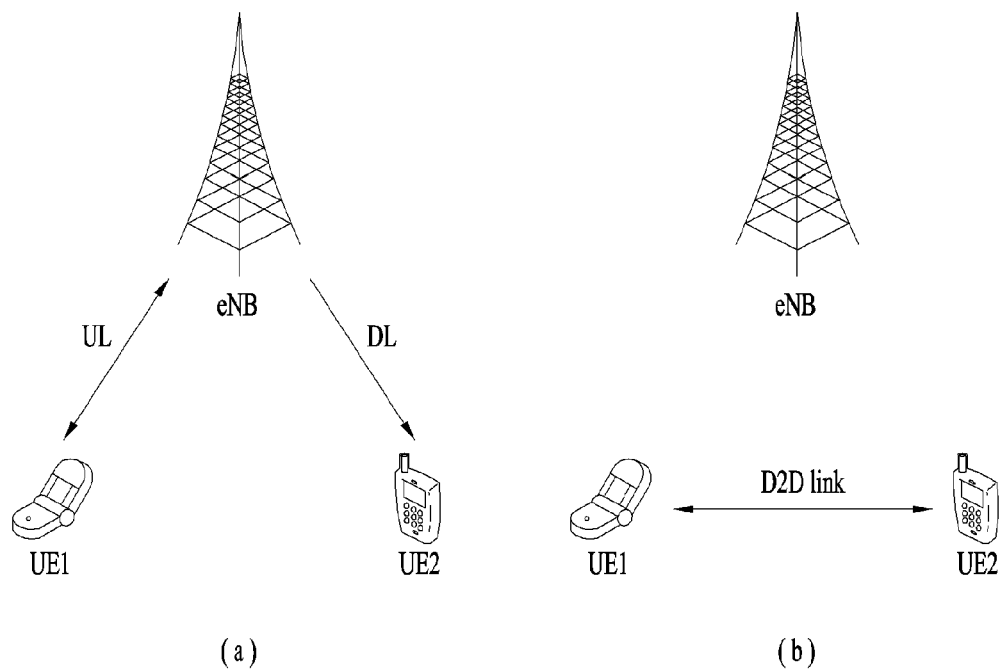

FIG. 11 is a conceptual diagram for explaining D2D communication. FIG. 11(a) shows a conventional eNB-based communication scheme. According to the conventional eNB-based communication scheme in FIG. 11(a), a first UE (UE1) can transmit data to an eNB in uplink and the eNB can forward data transmitted from the first UE (UE1) to a second UE (UE2) in downlink.

FIG. 11(b) shows a UE-to-UE communication scheme as an example of D2D communication. According to the UE-to-UE communication scheme in FIG. 11(b), data exchange between UEs can be performed without intervention of the eNB. A link directly established between such devices can be called a D2D link. Compared to the conventional eNB-based communication scheme, the D2D communication has advantages in that latency is reduced and a small amount of resources is required.

Although the D2D communication corresponds to a scheme for supporting device-to-device (or UE-to-UE) communication without intervention of the eNB, the D2D communication should not cause interference or disturbance to a conventional wireless communication system (e.g., 3GPP LTE/LTE-A) since it is performed in a manner of reusing resources in the conventional wireless communication system. In this context, it is also important to minimize interference caused to the D2D communication by a UE or an eNB operating in the conventional wireless communication system.

The present invention proposes a method of improving synchronization performance by repeatedly transmitting a prescribed synchronization signal, which can be used when UEs performing D2D communication match synchronization with each other.

According to conventional LTE communication (i.e., before 3GPP release 10), an eNB transmits a PSS (primary synchronization signal) based on a relatively short period of 5 ms and a UE performs symbol timing detection, cell ID detection, and frequency synchronization by receiving the PSS. In this case, if the UE fails in receiving PSS with sufficient energy due to weak signal reception strength, the UE progresses a synchronization process by performing an accumulate operation on a prescribed number of previously received PSSs.

Meanwhile, since a plurality of D2D UEs simultaneously transceive signals with each other in D2D communication, the amount of resources that can be used by a single UE for synchronization is limited. In other words, in D2D communication, a synchronization signal needs to have a sufficiently long period (e.g., 100 ms). And, each of the D2D UEs should perform the synchronization process by detecting the synchronization signal with the long period.

In consideration of the problem that it is difficult to detect a synchronization signal from accumulated synchronization signals due to the aforementioned long period, the present invention proposes a method of transmitting a specific synchronization signal repeatedly in order for UEs to secure sufficient energy.

Figure 12:
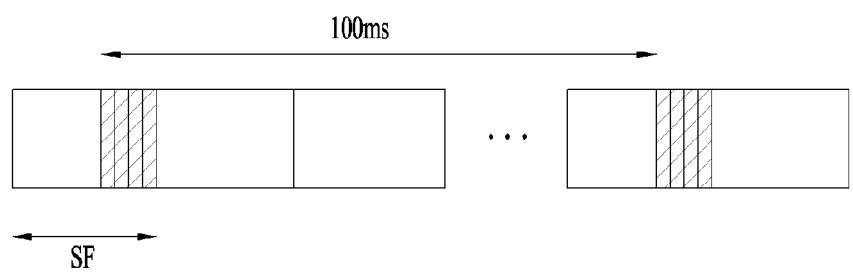
FIG. 12 is a reference diagram for explaining a case in which a synchronization signal is repeatedly transmitted according to the present invention.

FIG. 12 is a reference diagram for explaining a case in which a synchronization signal is repeatedly transmitted according to the present invention. According to the present invention, it is possible to accumulate a relatively small amount of energy by transmitting a synchronization signal repeatedly during a relatively long period. FIG. 12 shows a case in which a synchronization signal is repeated four times.

Although the present invention is described based on PSS (hereinafter referred to as PD2DSS or (P)D2DSS) corresponding to a synchronization signal used for D2D communication for convenience of description, the present invention can be applied to SSS (secondary synchronization signal) (hereinafter referred to as SD2DSS or (S)D2DSS) used for D2D communication as well as to the PD2DSS. In addition, the present invention can also be applied to other predefined signals in the similar manner. Further, the D2DSS (i.e., PD2DSS/SD2DSS) described in the present invention can be extensively applied to a case that an eNB/relay transmits a synchronization signal for D2D communication (e.g., a signal for D2D synchronization transceived between an eNB and a UE).

In the present invention, assuming that PD2DSS that can be included in one symbol has three types of sequences depending on a cell ID, the three types of sequences are referred to as PD2DSS_0, PD2DSS_1 and PD2DSS_2, respectively. However, this is only for convenience of description. In addition, when the present invention is applied, the invention should not be limitedly interpreted as that the PD2DSS must have the three types of sequences.

For instance, the types of PD2DSS can be increased in a manner of adding different root indices except root indices {25, 29, 34} of the currently used PD2DSS according to a network entity ID (i.e., synchronization reference ID (e.g., cell ID)), which is configured for performing synchronization. Moreover, the present invention can be similarly applied to different signals in a manner of defining K sequences (e.g., SD2DSS_0, SD2DSS_1, . . . , SD2DSS_k). For simplification of description, it is assumed that there are three types of synchronization signals unless mentioned otherwise. However, if the root indices are added or if the number of sequences is increased by M (where M>K) without any special consideration or restriction, it is included in the scope of the present invention.

In order to determine success or failure of synchronization detection, it can be determined whether a correlation peak is detected in a sequence identical to a transmitted sequence (i.e., sequence detection error) or whether a boundary of the symbol in which the synchronization signal is transmitted is correctly detected (i.e., timing error). For instance, when the PD2DSS_0 is transmitted, the correlation peak of the PD2DSS_0 may be detected at a wrong position due to influence of noise. In this case, although detection of the sequence PD2DSS_0 is successful, an error occurs in symbol boundary detection.

When the synchronization signal is transmitted N times according to the present invention, the most secure method is that the same PD2DSS is simply repeated N times. In other words, the PD2DSS_0 is repeatedly transmitted during N times repetition in the form of {PD2DSS_0, PD2DSS_0, PD2DSS_0, . . . }. In each interval/period/time, a receiving UE calculates correlation with respect to three signals of sync_0={PD2DSS_0, PD2DSS_0, . . . }, sync_1={PD2DSS_1, PD2DSS_1, . . . }, and sync_2={PD2DSS_2, PD2DSS_2, . . . }. If detecting a peak equal to or greater than a prescribed performance level, the receiving UE may recognize it as the synchronization detection.

Figure 13:
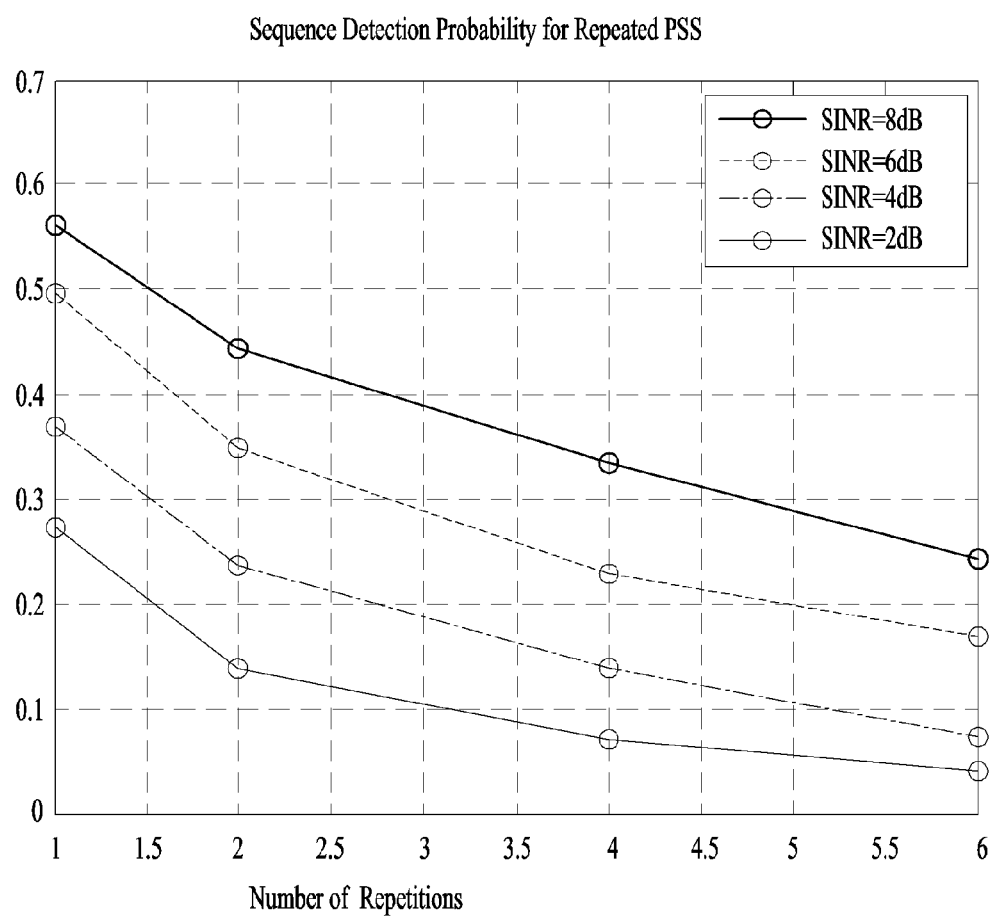
FIG. 13 is a reference diagram for explaining reception performance depending on the number of repeated PD2DSSs according to the present invention.

FIG. 13 is a reference diagram for explaining reception performance depending on the repetition number of PD2DSSs according to the present invention. Referring to FIG. 13, it can be seen that as the repetition number N of PD2DSSs increases, sequence detection performance is improved. In other words, if the number of repetitions increases, sequence correlation between respective synchronization signals (e.g., sync_0, sync_1, sync_2, etc.) decreases, whereby the sequence detection performance is improved. However, since the synchronization signal have the same sequence (i.e., the same PD2DSS_N) in all intervals, a symbol boundary detection error, which causes confusion between start and end points of the synchronization signal with N-symbol length, is highly likely to occur.

Figure 14:
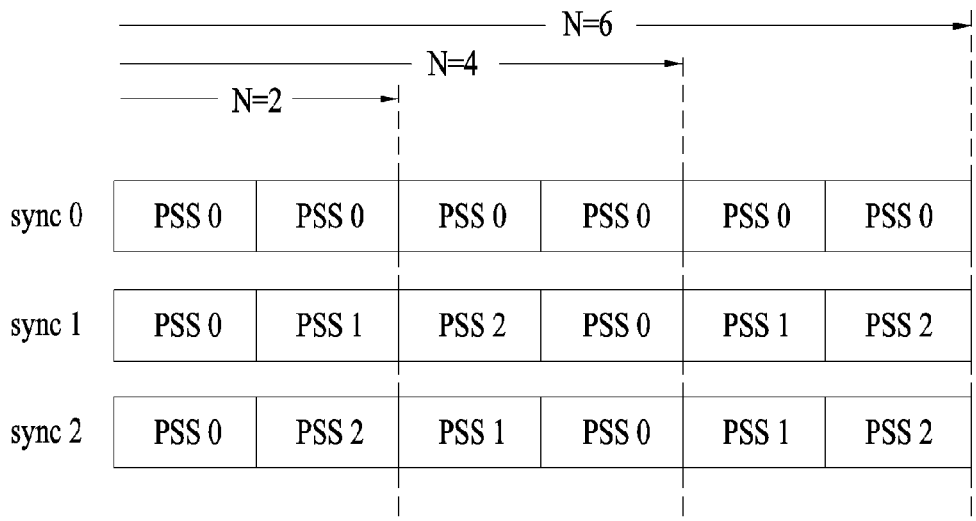
FIGS. 14 and 15 are reference diagrams for explaining synchronization signals according to one embodiment of the present invention.
Figure 15:
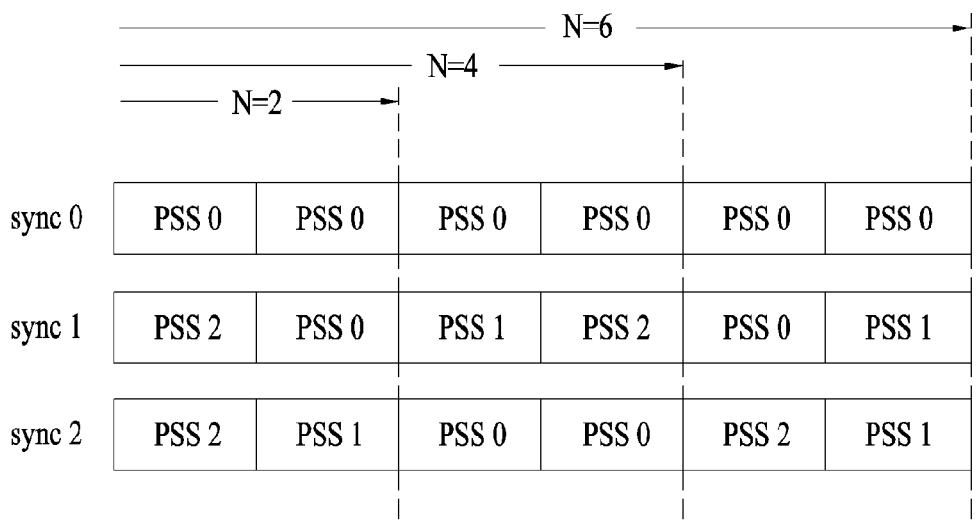

Therefore, according to the present invention, a synchronization signal configuration may differ in each of the synchronization signals. FIGS. 14 and 15 are reference diagrams for explaining synchronization signals according to one embodiment of the present invention.

FIG. 14 shows a case in which configurations of three synchronization signals are sync_0={PD2DSS_0, PD2DSS_0, PD2DSS_0, . . . }, sync_1={PD2DSS_0, PD2DSS_1, PD2DSS_2, PD2DSS_0, . . . }, and sync2={PD2DSS_0, PD2DSS_2, PD2DSS_1, PD2DSS_0, . . . }, respectively. In other words, a sequence of the sync_0 is changed in order of +0, a sequence of the sync_1 is changed in order of +1, and a sequence of the sync_2 is changed in order of +2 (e.g., sequence modulo 3).

If the synchronization signals are configured as shown in FIG. 14, in comparison with the case in which the specific D2DSS is simply repeated as shown in FIG. 12, the sequence detection performance may be degraded but the symbol boundary detection error can be reduced since the sequences of the synchronization signals are different in each symbol.

In the case of the synchronization signals of FIG. 14, PD2DSS_0 is repeated with a three-symbol period and it causes a negative effect on the sequence detection performance. According to the present invention, a zero-block shift, a one-block shift and a two-block shift can be applied to the sync_0, the sync_1, and the sync_2, respectively in order to prevent the above-mentioned negative effect. Therefore, the synchronization signals can be configured to minimize parts (or roots) overlapping between respective synchronization sequences.

In addition, according to the present invention, a simple repetition of a sequence and a change of in the sequence can be simultaneously applied to each symbol. This is to harmonize the sequence detection performance in repeating D2DSS simply and the symbol boundary detection performance in changing the sequence. A single sequence is repeated k times and then different m sequences are consecutively arranged (where k*m=N). That is, if values of k and m are changed according to the present invention, the synchronization signal performance can be modified. In this case, k is preferred to be equal to or greater than 2 (i.e., k≥2) to detect both time synchronization and frequency synchronization.

Figure 16:
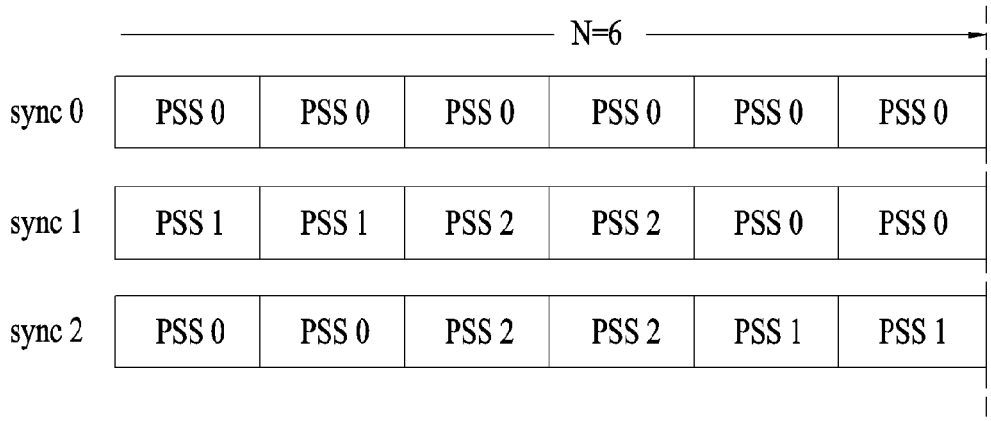
FIG. 16 shows an embodiment of applying a simple repetition and a sequence change to a sequence constituting a synchronization signal simultaneously according to the present invention.

FIG. 16 shows an embodiment of simultaneously applying a simple repetition and a sequence change to a sequence constituting a synchronization signal according to the present invention. In FIG. 16, N is assumed to be 6 (i.e., N=6). More particularly, FIG. 16 shows a case of configuring a synchronization signal by repeating the same sequence twice and combining three different repetitive sequences at the same time.

If using the synchronization signals shown in FIG. 16, a UE may perform synchronization detection on all symbols. Moreover, the UE is able to detect both time synchronization and frequency synchronization in a manner of selecting one symbol from an interval consisting of two random consecutive symbols and then comparing the selected symbol with an original sequence in a frequency domain.

Figure 17:
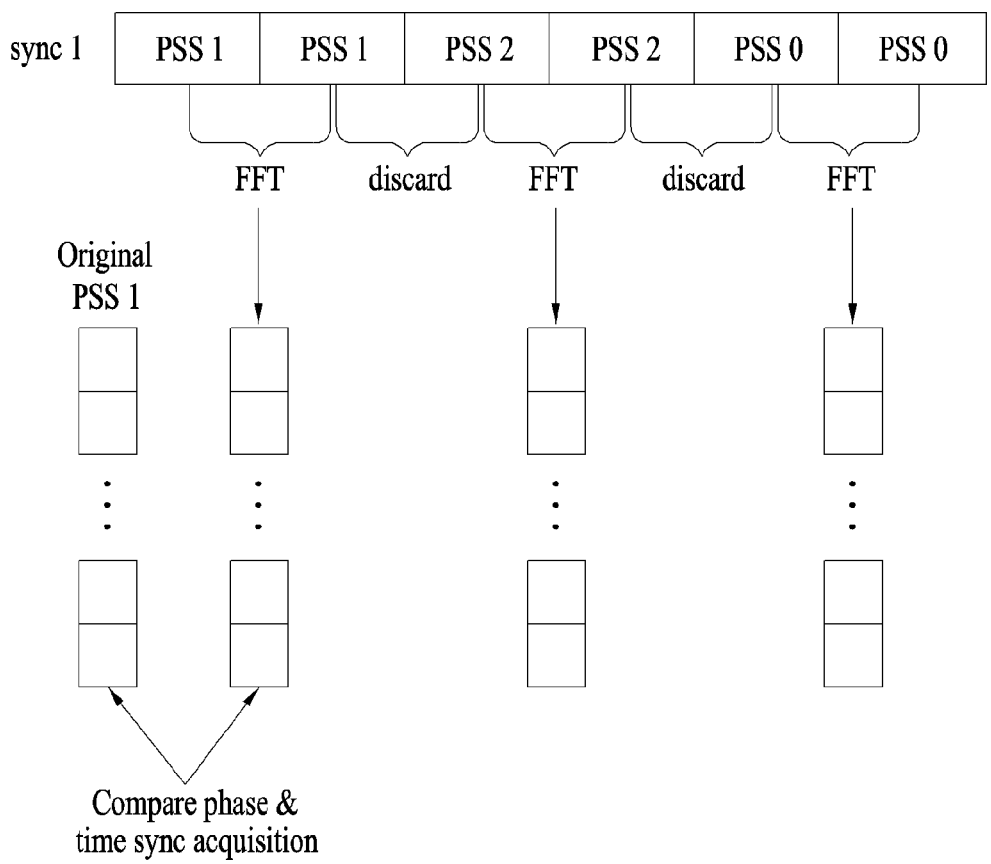
FIG. 17 is a reference diagram for explaining a procedure for simultaneously detecting time/frequency synchronization according to the present invention.

FIG. 17 is a reference diagram for explaining a procedure for simultaneously detecting time synchronization and frequency synchronization according to the present invention.

Hereinafter, a method for simultaneously obtaining time/frequency synchronization by performing FFT on one random symbol is described with reference to FIG. 17. A UE may detect one symbol length from a specific interval in a signal in which the same D2DSSs are arranged repeatedly and consecutively in order to obtain time/frequency synchronization (e.g., D2DSS in which consecutive sequences are repeated twice). Subsequently, the UE performs FFT on the detected symbol and then compares its phase with that of a transmitted original sequence (e.g., original D2DSS). Thereafter, the UE is able to obtain time synchronization between the original sequence and the received sequence and then obtain frequency synchronization after adjusting a time error. In other words, the UE performs one-time synchronization detection with respect to each D2DSS at a random time (i.e., one-shot detection) instead of detecting the D2DSS at every sampling time. Therefore, the above-described method is advantageous in that the complexity of the synchronization detection is reduced.

Further, according to the present invention, a last symbol of the synchronization signal having the aforementioned sequence configuration (or a plurality of symbols located at the end of the signal) can be configured with a specific sequence at all times. In this case, it is preferable that an end sequence configured with the specific sequence is different from the sequence constituting the synchronization signal. And, the detection error can be significantly reduced through the end sequence.

Figure 18:
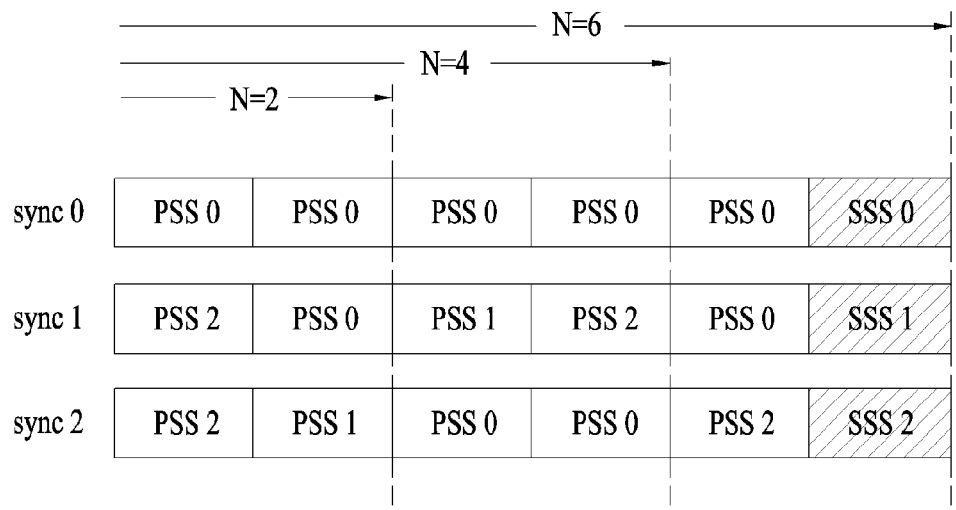
FIG. 18 shows a case of applying SD2DSS as an additional end sequence to a signal configured with a synchronization sequence according to the present invention.

FIG. 18 shows a case of applying SD2DSS as an additional end sequence to a signal configured with a synchronization sequence according to the embodiment (i.e., FIG. 15) of the present invention.

According to the present invention, a sequence with a root index different from that of a repetitive sequence may be used in an end sequence. For instance, a type of the repetitive sequence may be determined by selecting elements from {PD2DSS_0, PD2DSS_1, PD2DSS_2} and a last symbol (or a plurality of symbols located at the end) may be configured with PD2DSS_3, which uses a new root index. Therefore, while detecting a synchronization signal, a receiving end can recognize the end of the synchronization signal if the PD2DSS_3 is detected.

In addition, the end sequence may be configured by previously adding a fixed value (e.g., a value of K) to a root index of the repetitive sequence instead of fixing the root index of the end sequence in advance. For instance, the repetitive sequence may be configured by selecting the elements from {PD2DSS_0, PD2DSS_1, PD2DSS_2} and the end sequence may be configured to have an offset of K=3. In other words, the end sequence may be configured by adding K (i.e., +3) to ID of a sequence used immediately before the end sequence (or a first repetitive symbol, a prescribed position in the repetitive symbol). For example, repetitive synchronization signals can be configured in such a manner of sync_0={PD2DSS_0, . . . , PD2DSS_0, PD2DSS_3}, sync_1={PD2DSS_1, . . . , PD2DSS_1, PD2DSS_4}, and sync2={PD2DSS_2, . . . , PD2DSS_2, PD2DSS_5}.

Moreover, a number of specific operators may be combined in order to determine the root index of the end sequence. For instance, a combination of addition, subtraction, multiplication, division, and other arithmetic operations including a modular arithmetic operation (e.g., modular arithmetic operation after addition) can be applied. As a particular example, if an arithmetic operation of +3 mod 5 (i.e., modular arithmetic operation after addition) is performed, it may result in sync_0={PD2DSS_0, . . . , PD2DSS_0, PD2DSS_3}, sync_1={PD2DSS_1, . . . , PD2DSS_1, PD2DSS4}, and sync_2={PD2DSS_2, . . . , PD2DSS_2, PD2DSS_0}. As another example, if an arithmetic operation of *3 mod 4 (i.e., modular arithmetic operation after multiplication) is performed, it may result in sync_0={PD2DSS_0, PD2DSS_0, PD2DSS_0}, sync_1={PD2DSS_1, . . . , PD2DSS_1, PD2DSS_3}, and sync_2={PD2DSS_2, . . . , PD2DSS_2, PD2DSS_2}.

Furthermore, a sequence with a length different from that of the repetitive sequence can be used as the end sequence. For example, PD2DSS with length 63 is used for the repetitive sequence and a sequence with length (63+L) or (63−L) can be used for the last symbol (or a plurality of symbols located at the end) of the synchronization signal. In particular, even though the root indices of the sequences are identical to each other, if the lengths of the sequences are different from each other, the UE may recognize the end sequence since correlation between the sequences is zero.

Further, according to the present invention, after completing a step of obtaining the time/frequency synchronization by detecting the synchronization sequence, the UE may perform a step of detecting the end sequence. That is, correlation of the end sequence can be detected only if detected correlation of the synchronization sequence is equal to or greater than a prescribed value. And, only if the correlation of the end sequence is equal to or greater than a prescribed value, the time/frequency synchronization obtained through the synchronization sequence is considered to be valid.

Further, in the case of the synchronization signal, the synchronization is detected in a manner that energy is detected in each symbol (i.e., correlation between sequences is calculated based on the unit of a symbol) and then the detected energy is combined with respect to all the synchronization symbols. In this case, phase rotation in each symbol interval does not affect the detected energy value since the phase rotation has no influence on an absolute value of the signal.

Thus, according to the present invention, if a different phase rotation pattern is configuring in each of N symbols in the synchronization signal, prescribed information can be indicated at the same time as when the synchronization signal is transmitted. For instance, the information indicated together with the synchronization signal may include a type of D2D communication (e.g., public safety/non-public safety), a resource allocation scheme used for D2D communication, an additional cell ID, and the like.

In this case, since an entire phase of the synchronization signal may be arbitrarily changed depending on a channel, only a relative phase change pattern can be considered with reference to the first symbol in case of configuring the phase rotation pattern. That is, the receiving end (e.g., a UE) is able to restore original information in a manner of detecting the phase rotation pattern with reference to the first symbol. For instance, in case of N=4, phase patterns of the respective signal may be configured as phase_0={0, 0, 0, 0}, phase_1={0, π/4, π, 3π/4}, phase2={0, π, 0, π}, and phase3={0, 3π/4, 3π/2, 0}, respectively. After determining which is the original synchronization signal by performing the energy detection, the UE calculates a phase value in each symbol and then detects the phase change pattern. Thereafter, the UE is able to obtain the additional information.

Figure 19:
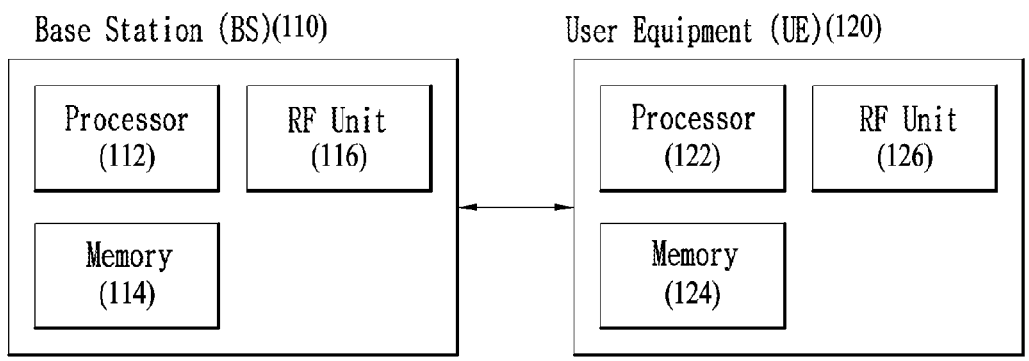
FIG. 19 illustrates a base station and user equipment applicable to an embodiment of the present invention.

FIG. 19 is a diagram of a base station and a user equipment applicable to one embodiment of the present invention. If a relay node is included in a wireless communication system, a communication in backhaul link is performed between a base station and the relay node and a communication in access link is performed between the relay node and a user equipment. Therefore, the base station or user equipment shown in the drawing can be substituted with the relay node in some cases.

Referring to FIG. 19, a wireless communication system includes a base station (BS) 110 and a user equipment (UE) 120. The base station 110 includes a processor 112, a memory 114 and an RF (radio frequency) unit 116. The processor 112 can be configured to implement the procedures and/or methods proposed by the present invention. The memory 114 is connected to the processor 112 and stores various kinds of informations related to operations of the processor 112. The RF unit 116 is connected to the processor 112 and transmits and/or receives radio or wireless signals. The user equipment 120 includes a processor 122, a memory 124 and an RF unit 126. The processor 122 can be configured to implement the procedures and/or methods proposed by the present invention. The memory 124 is connected to the processor 122 and stores various kinds of informations related to operations of the processor 122. The RF unit 126 is connected to the processor 122 and transmits and/or receives radio or wireless signals. The base station 110 and/or the user equipment 120 can have a single antenna or multiple antennas.

The above-described embodiments may correspond to combinations of elements and features of the present invention in prescribed forms. And, it may be able to consider that the respective elements or features may be selective unless they are explicitly mentioned. Each of the elements or features may be implemented in a form failing to be combined with other elements or features. Moreover, it may be able to implement an embodiment of the present invention by combining elements and/or features together in part. A sequence of operations explained for each embodiment of the present invention may be modified. Some configurations or features of one embodiment may be included in another embodiment or can be substituted for corresponding configurations or features of another embodiment. And, it is apparently understandable that a new embodiment may be configured by combining claims failing to have relation of explicit citation in the appended claims together or may be included as new claims by amendment after filing an application.

Embodiments of the present invention may be implemented using various means. For instance, embodiments of the present invention may be implemented using hardware, firmware, software and/or any combinations thereof. In case of the implementation by hardware, one embodiment of the present invention may be implemented by at least one of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, one embodiment of the present invention may be implemented by modules, procedures, and/or functions for performing the above-explained functions or operations. Software code may be stored in a memory unit and may be then drivable by a processor.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

Although a synchronization method for D2D (device-to-device) communication in a wireless communication system and apparatus for the same are described with reference to examples applied to 3GPP LTE system in the foregoing description, the present invention is applicable to various kinds of wireless communication systems as well as to the 3GPP LTE system.

What is claimed is:

1. A method of detecting a synchronization signal for D2D (device-to-device) communication by a user equipment (UE) in a wireless communication system, the method comprising:

receiving, from another D2D UE, repeatedly of a predetermined number, a synchronization signal on a synchronization signal transmission period for the D2D communication;

accumulating an energy of the repeatedly received synchronization signal; and detecting the synchronization signal from the another D2D UE using the energy of the accumulated synchronization signal, wherein the synchronization signal is configured with at least one synchronization sequence generated based on a first root index according to a synchronization reference identifier (ID).

2. The method of claim 1, wherein the synchronization signal transmission period for the D2D communication is set to be longer than a synchronization signal transmission period for communication between a base station and the UE.

3. The method of claim 1, wherein the at least one synchronization sequence is composed of only a same synchronization sequence.

4. The method of claim 1, wherein, in each synchronization signal, a synchronization sequence is configured to be changed according to different time intervals.

5. The method of claim 1, wherein the at least one synchronization sequence is assigned in the synchronization signal transmission period according to an offset set differently with respect to each of the synchronization signal.

6. The method of claim 1, wherein in the at least one synchronization sequence, a plurality of same synchronization sequences are assigned consecutively.

7. The method of claim 1, wherein the detecting the synchronization signal comprises detecting one symbol from a symbol interval configured with consecutively assigned synchronization sequences.

8. The method of claim 1, wherein the synchronization signal comprises an end sequence for indicating a symbol boundary.

9. The method of claim 8, wherein the end sequence is generated based on a second root index different from the first root index.

10. The method of claim 8, wherein the end sequence is generated based on the first root index and a prescribed offset.

11. The method of claim 8, wherein the end sequence has a length different from a length of the at least one synchronization sequence.

12. The method of claim 1, wherein the synchronization signal is configured to have different phase rotation patterns according to time intervals.

13. The method of claim 12, wherein the phase rotation patterns indicate at least one selected from the group consisting of a type of the D2D communication, a resource allocation scheme for the D2D communication, and an additional cell ID.

14. A user equipment (UE) for detecting a synchronization signal for D2D (device-to-device) communication in a wireless communication system, the user equipment comprising:

a transceiver; and a processor configured to:

control the transceiver to receive, from another D2D UE, repeatedly of a predetermined number, a synchronization signal on a synchronization signal transmission period for the D2D communication, accumulate an energy of the repeatedly received synchronization signal, and detect the synchronization signal from the another D2D UE using the energy of the accumulated synchronization signal, wherein the synchronization signal is configured with at least one synchronization sequence generated based on a first root index according to a synchronization reference identifier (ID).

* * * * *